United States Patent
Rao

(10) Patent No.: US 9,967,350 B2
(45) Date of Patent: May 8, 2018

(54) THIRD-PARTY ORCHESTRATION MODULE FOR A CLOUD EXCHANGE PROGRAMMABLE NETWORK PLATFORM

(71) Applicant: Equinix, Inc., Redwood City, CA (US)

(72) Inventor: Ravindra J N Rao, Santa Clara, CA (US)

(73) Assignee: Equinix, Inc., Redwood City, CA (US)

( * ) Notice: Subject to any disclaimer, the term of this patent is extended or adjusted under 35 U.S.C. 154(b) by 255 days.

(21) Appl. No.: 15/001,839

(22) Filed: Jan. 20, 2016

(65) Prior Publication Data

US 2016/0337193 A1    Nov. 17, 2016

Related U.S. Application Data

(60) Provisional application No. 62/160,547, filed on May 12, 2015.

(51) Int. Cl.
*G06F 15/173* (2006.01)
*H04L 29/08* (2006.01)
(Continued)

(52) U.S. Cl.
CPC .......... *H04L 67/16* (2013.01); *H04L 12/4633* (2013.01); *H04L 12/4641* (2013.01);
(Continued)

(58) Field of Classification Search
CPC .. H04L 67/16; H04L 12/4633; H04L 12/4641
See application file for complete search history.

(56) References Cited

U.S. PATENT DOCUMENTS 6,868,454 B1 * 3/2005 Kubota ............... G06F 9/465
              709/201
7,451,071 B2   11/2008 Ferguson et al.
(Continued)

FOREIGN PATENT DOCUMENTS

WO    2014147197 A1    9/2015

OTHER PUBLICATIONS

International Search Report and Written Opinion of International Application No. PCT/US2016/031943, dated Jul. 29, 2016, 13 pp.
(Continued)

*Primary Examiner* — Normin Abedin
*Assistant Examiner* — Atta Khan
(74) *Attorney, Agent, or Firm* — Shumaker & Sieffert, P.A.

(57) ABSTRACT

In some examples, a programmable network platform comprises a third-party orchestration module configured to communicate with a cloud service provider (CSP) orchestration system; and a centralized network controller configured to receive a service request that specifies a cloud service applied by a CSP network operated by a CSP on a network of a cloud exchange operated by a cloud exchange provider. The CNC is further configured to, in response to the service request, invoke the third-party orchestration module to communicate with the CSP orchestration system to request that the CSP orchestrate the cloud service on the network of the cloud exchange. The CNC provisions the network of the cloud exchange within a data center to deliver the cloud service from the CSP network attached to the network of the cloud exchange to a customer network attached to the network of the cloud exchange.

19 Claims, 19 Drawing Sheets

(51) Int. Cl.
  *H04L 12/947* (2013.01)
  *H04L 12/46* (2006.01)
  *H04L 12/933* (2013.01)
  *H04L 12/713* (2013.01)
  *H04L 12/715* (2013.01)
  *H04L 12/24* (2006.01)

(52) U.S. Cl.
  CPC ...... *H04L 41/5025* (2013.01); *H04L 41/5051* (2013.01); *H04L 45/586* (2013.01); *H04L 45/64* (2013.01); *H04L 49/10* (2013.01); *H04L 49/25* (2013.01); *H04L 41/5096* (2013.01)

(56) References Cited

U.S. PATENT DOCUMENTS

| | | | |
|---|---|---|---|
| 7,584,247 | B2 | 9/2009 | Ochiai et al. |
| 7,899,903 | B2 | 3/2011 | Sanghvi et al. |
| 8,122,106 | B2 | 2/2012 | Hunt et al. |
| 8,650,320 | B1 * | 2/2014 | Merrick .................. H04L 69/18 370/465 |
| 2002/0152305 | A1 | 10/2002 | Jackson et al. |
| 2004/0199572 | A1 | 10/2004 | Hunt et al. |
| 2004/0236852 | A1 | 11/2004 | Birkestrand et al. |
| 2006/0179042 | A1 | 8/2006 | Bram et al. |
| 2007/0276898 | A1 | 11/2007 | Berkland et al. |
| 2010/0293360 | A1 | 11/2010 | Schoop et al. |
| 2011/0295646 | A1 | 12/2011 | Barros |
| 2012/0147894 | A1 * | 6/2012 | Mulligan ............ G06F 9/45533 370/395.53 |
| 2012/0331113 | A1 | 12/2012 | Jain et al. |
| 2013/0036156 | A1 | 2/2013 | Todorova et al. |
| 2013/0085242 | A1 | 4/2013 | Hesse et al. |
| 2013/0086242 | A1 | 4/2013 | Bryan et al. |
| 2013/0117847 | A1 * | 5/2013 | Friedman ............... H04L 63/102 726/22 |
| 2013/0283188 | A1 | 10/2013 | Sanghvi et al. |
| 2013/0283296 | A1 | 10/2013 | Brown |
| 2013/0287026 | A1 | 10/2013 | Davie |
| 2013/0339423 | A1 * | 12/2013 | Degtiarov ............. G06F 9/5072 709/203 |
| 2014/0122683 | A1 | 5/2014 | Zhao et al. |
| 2014/0229596 | A1 | 8/2014 | Burke et al. |
| 2014/0279201 | A1 | 9/2014 | Lyoob et al. |
| 2015/0067171 | A1 * | 3/2015 | Yum ..................... G06F 9/5072 709/226 |
| 2015/0244771 | A1 | 8/2015 | Pasdar et al. |
| 2016/0197834 | A1 * | 7/2016 | Luft .................... H04L 12/4641 709/223 |
| 2016/0337175 | A1 * | 11/2016 | Rao ......................... H04L 49/25 |
| 2016/0337179 | A1 | 11/2016 | Rao |
| 2016/0337180 | A1 | 11/2016 | Rao |
| 2016/0337473 | A1 | 11/2016 | Rao |
| 2016/0337474 | A1 | 11/2016 | Rao |
| 2017/0078410 | A1 | 3/2017 | Rao |

OTHER PUBLICATIONS

Rosen, et al., "BGP/MPLS IP Virtual Private Networks (VPNs)," Network Working Group, RFC 4364, Feb. 2006, 47 pp.
U.S. Appl. No. 15/099,407, filed by Juxiang Teng et al., filed Apr. 14, 2016.
U.S. Appl. No. 14/927,451, filed by Gagan Maheshwari et al., filed Oct. 29, 2015.
U.S. Appl. No. 14/927,306, filed by Parveen Kumar et al., filed Oct. 29, 2015.
U.S. Appl. No. 14/927,315, filed by Venkatachalam Rangasamy et al., filed Oct. 29, 2015.

* cited by examiner

THIRD-PARTY ORCHESTRATION MODULE FOR A CLOUD EXCHANGE PROGRAMMABLE NETWORK PLATFORM

This application claims the benefit of U.S. Provisional Application No. 62/160,547, filed May 12, 2015, the entire content of which is incorporated by reference herein.

TECHNICAL FIELD

The invention relates to computer networks and, more specifically, to facilitating service provisioning and delivery among cloud service customers and cloud service providers.

BACKGROUND

Cloud computing refers to the use of dynamically scalable computing resources accessible via a network, such as the Internet. The computing resources, often referred to as a "cloud," provide one or more services to users. These services may be categorized according to service types, which may include for examples, applications/software, platforms, infrastructure, virtualization, and servers and data storage. The names of service types are often prepended to the phrase "as-a-Service" such that the delivery of applications/software and infrastructure, as examples, may be referred to as Software-as-a-Service (SaaS), Platform-as-a-Service (PaaS), and Infrastructure-as-a-Service (IaaS), respectively.

The term "cloud-based services" or, more simply, "cloud services" refers not only to services provided by a cloud, but also to a form of service provisioning in which cloud customers contract with cloud service providers for the online delivery of services provided by the cloud. Cloud service providers manage a public, private, or hybrid cloud to facilitate the online delivery of cloud services to one or more cloud customers.

SUMMARY

In general, this disclosure describes a programmable network platform for dynamically programming a cloud-based service exchange ("cloud exchange") to responsively and assuredly fulfill service requests that encapsulate business requirements for services provided by the cloud exchange and/or cloud service providers coupled to the cloud exchange. The programmable network platform as described herein may, as a result, orchestrate a business-level service across heterogeneous cloud service providers according to well-defined service policies, quality of service, service level agreements, and costs, and further according to a service topology for the business-level service.

The programmable network platform enables the cloud service provider that administers the cloud exchange to dynamically configure and manage the cloud exchange to, for instance, facilitate virtual connections for cloud services delivery from multiple cloud service providers to one or more cloud customers. The cloud exchange may enable cloud customers to bypass the public Internet to directly connect to cloud services providers so as to improve performance, reduce costs, increase the security and privacy of the connections, and leverage cloud computing for additional applications. In this way, enterprises, network carriers, and SaaS customers, for instance, can at least in some aspects integrate cloud services with their internal applications as if such services are part of or otherwise directly coupled to their own data center network.

In some aspects, a programmable network platform as described herein operates according to a distributed model in which a centralized network controller (CNC) manages globally-distributed and intelligent logic in the form of network field units (NFUs). The CNC may receive a business service request via an interface and convert the business service request into business instantiation parameters and network provisioning parameters to be delivered and assured as a business service within the cloud exchange. The CNC thus operates as a central intelligent processing unit of the programmable network platform. Each instantiation of a programmable network platform may have one logical instance of this intelligent logic (i.e., the CNC). The CNC may provide service assurance using a Monitor, Analyze, Plan and Execute (MAPE) loop methodology and is implemented to ensure the service level agreements are adhered to by the service.

The various NFUs are distributed among globally-distributed cloud exchange points of a cloud exchange provider that administers the programmable network platform. Each NFU receives network instantiation commands/parameters from the CNC and instantiates and configures the network resource(s) that is needed to deliver the service. The NFU has the intelligence to deliver and assure network services according to CNC requests. In some aspects, the NFU further has the capability of communicating with a third party orchestration system, if needed by the service request. The NFU applies a separate MAPE loop to ensure that the network services delivered by the unit is assured for the life cycle of the service In some aspects, a programmable network platform described herein may provide for orchestrating a service that involves both native and third-party components as single service while ensuring policy, security, and SLA consistency. The programmable network platform may orchestrate the third-party service components using a third-party (or "partner") orchestration module (or "plugin"). A third-party orchestration module allows a third-party orchestration system to register its capabilities (e.g., service catalog, policy, security and SLA) with the programmable network platform. The cloud service provider, as the service owner, may use the programmable network platform to direct the third-party orchestration system, via the corresponding third-party orchestration module, as part of the workflow for the service delivery to stand-up and deliver a third-party service for the service.

In some aspects, the programmable network platform described herein, may provision a cloud exchange to deliver services made up of multiple constituent services provided by multiple different cloud service providers. Each of these constituent services is referred to herein as a "micro-service" in that it is part of an overall service applied to service traffic. That is, a plurality of micro-services may be applied to service traffic in a particular "arrangement," "ordering," or "topology," in order to make up an overall service for the service traffic. The micro-services themselves may be applied or offered by the cloud service providers.

The programmable network platform may in this way orchestrate a business-level service across heterogeneous cloud service providers. The programmable network platform exposes interfaces by which a portal, console (e.g., user interface application), or other application may define the service policy, quality, SLAs, and cost as a coordinated service topology made up of micro-services provided by different cloud service providers (or "cloud vendors"). Each micro-service may have a corresponding service policy, quality, SLA, and cost, as part of the overall, end-to-end business service definition. When provided with a service definition for an end-to-end service having multiple component micro-services, the programmable network platform orchestrates each of the micro-services within the cloud exchange and stitches the micro-services together according to the defined topology in order to reify the end-to-end service within the cloud exchange data plane (e.g., an edge network for the cloud exchange). As a result, the cloud exchange interconnects, in the data plane, micro-services provided by respective cloud services providers on behalf of and for the benefit of a customer of the cloud exchange. In doing so, the cloud exchange provider may facilitate business transactions between the cloud service providers and customers.

In some aspects, when provided with a service definition for an end-to-end service having multiple component micro-services, a programmable network platform as described herein may orchestrate each of the micro-services within the cloud exchange and stitch the micro-services together according to the defined topology in order to reify the end-to-end service within the cloud exchange. In accordance with techniques of this disclosure, the service definition for an end-to-end service may enable a user of the programmable network platform to define not only the end-to-end service but also the service topology in such a ways as to ensure the correct sequencing of the micro-services service chain. The data encapsulated in the data model for the service definition may also include the authoritative service owner for business purposes (e.g., billing and SLA assurance). The "user" may refer to a customer, the cloud exchange provider, or a cloud service provider that is the authoritative service owner.

By using a data model for a multi-cloud, multi-service service definition as described herein, the programmable network platform (and/or other orchestration systems such as software-defined networking (SDN) controllers or orchestrators) may be enabled to recognize a service request as a request for a set of micro-services that make up the entire service. In some examples, the service definition includes several sections that will enable the programmable network platform to provide the service of chaining several services, whether of native services provided by the cloud exchange provider or of cloud services provided one or multiple cloud service providers. That is, the cloud exchange provider that administers the programmable network platform is able to provide a chaining service that, when given respective definitions for multiple micro-services and a topology (or sequence) for the multiple micro-services, interconnects the micro-services according to the topology to facilitate an end-to-end service. The data model thus provides data with which the programmable network platform can effectively instantiate the requested chain of services and to also ensure that the services thus rendered are chained in the correct topology. The data model may be divided by the programmable network platform into one or more service requests that the native programmable network platform for the cloud exchange may issue to other service orchestration systems to complete. Other service orchestration systems may include, e.g., SDN controllers and/or orchestration systems for cloud service providers that facilitate NFV-instantiation and service traffic routing to/from NFV instances.

In some examples, a programmable network platform comprises at least one programmable processor; a third-party orchestration module configured for execution by the at least one programmable processor to communicate with a cloud service provider orchestration system; and a centralized network controller configured for execution by the at least one programmable processor to receive a service request that specifies a cloud service applied by a cloud service provider network operated by a cloud service provider on a network of a cloud exchange operated by a cloud exchange provider, wherein the centralized network controller is further configured to, in response to the service request, invoke the third-party orchestration module to communicate with the cloud service provider orchestration system to request that the cloud service provider orchestrate the cloud service on the network of the cloud exchange, and wherein the centralized network controller provisions the network of the cloud exchange within a data center to deliver the cloud service from the cloud service provider network attached to the network of the cloud exchange to a customer network attached to the network of the cloud exchange.

In some examples, a method comprises receiving, by a centralized network controller of a programmable network platform, a service request that specifies a cloud service applied by a cloud service provider network operated by a cloud service provider on a network of a cloud exchange operated by a cloud exchange provider; invoking, by the centralized network controller in response to the service request, a third-party orchestration module to communicate with the cloud service provider orchestration system to request that the cloud service provider orchestrate the cloud service on the network of the cloud exchange; and provisioning, by the centralized network controller, the network of the cloud exchange within a data center to deliver the cloud service, from the cloud service provider network attached to the cloud-based services exchange point, to a customer network attached to the cloud-based services exchange point.

In some examples, a network data center comprises a cloud exchange comprising a network, the cloud exchange operated by a cloud exchange provider; and a programmable network platform comprising: at least one programmable processor; a third-party orchestration module to communicate with a cloud service provider orchestration system; and a centralized network controller configured for execution by the at least one programmable processor to receive a service request that specifies a cloud service applied by a cloud service provider network operated by a cloud service provider on the network of a cloud exchange, wherein the centralized network controller is further configured to, in response to the service request, invoke the third-party orchestration module to communicate with the cloud service provider orchestration system to request that the cloud service provider orchestrate the cloud service on the network of the cloud exchange, and wherein the centralized network controller provisions the network of the cloud exchange to deliver the cloud service from the cloud service provider network attached to the network of the cloud exchange to a customer network attached to the network of the cloud exchange.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like reference characters denote like elements throughout the figures and text.

DETAILED DESCRIPTION

In general, this disclosure describes a programmable network platform for real-time configuration and management of a cloud-based services exchange ("cloud exchange"). As described herein, the interconnection platform provides customers of the exchange, e.g., enterprises, network carriers, and SaaS customers, with secure, private, virtual connections to multiple cloud service providers (CSPs) globally. The multiple CSPs participate in the cloud exchange by virtue of their having at least one accessible port in the cloud exchange by which a customer can connect to the one or more cloud services offered by the CSPs, respectively.

According to various examples described herein, a cloud exchange is described that allows private networks of any customer to be directly cross-connected to any other customer at a common point, thereby allowing direct exchange of network traffic between the networks of the customers. Customers may include network carriers (or network service providers), enterprises, and other users of cloud services offered by one or more cloud service providers.

Figure 1:
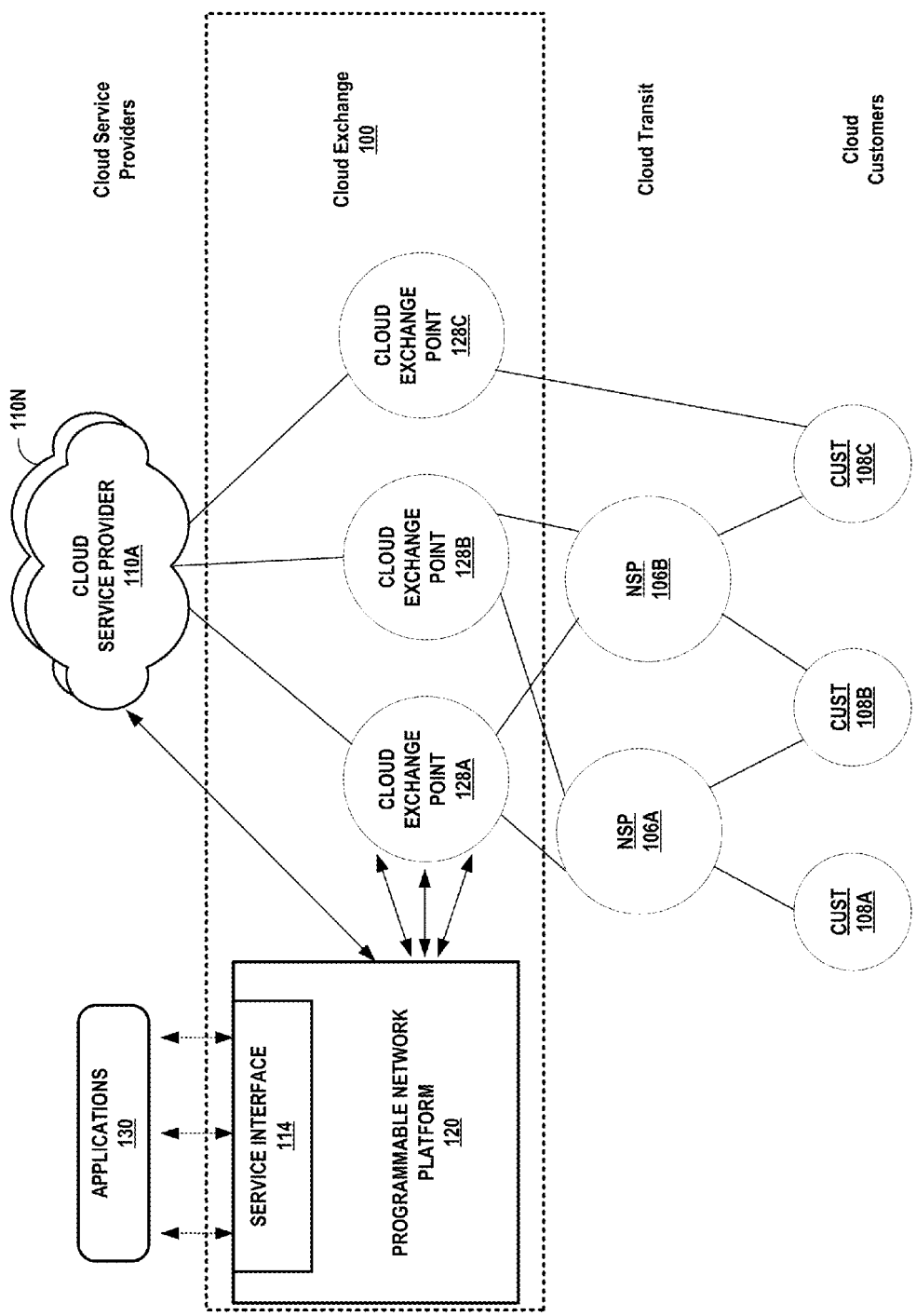
FIG. 1 is a block diagram that illustrates a high-level view of a data center that provides an operating environment for a cloud-based services exchange.

FIG. 1 illustrates a conceptual view of a network system 2 having a metro-based cloud exchange that provides multiple cloud exchange points according to techniques described herein. Each of cloud-based services exchange points 128A-128D (described hereinafter as "cloud exchange points" and collectively referred to as "cloud exchange points 128") of cloud-based services exchange 100 ("cloud exchange 100") may represent a different data center geographically located within the same metropolitan area ("metro-based," e.g., in New York City, N.Y.; Silicon Valley, Calif.; Seattle-Tacoma, Wash.; Minneapolis-St. Paul, Minn.; London, UK; etc.) to provide resilient and independent cloud-based services exchange by which cloud-based services customers ("cloud customers") and cloud-based service providers ("cloud providers") connect to receive and provide, respectively, cloud services. In various examples, cloud exchange 100 may include more or fewer cloud exchange points 128. In some instances, a cloud exchange 100 includes just one cloud exchange point 128. As used herein, reference to a "cloud exchange" or "cloud-based services exchange" may refer to a cloud exchange point. A cloud exchange provider may deploy instances of cloud exchanges 100 in multiple different metropolitan areas, each instance of cloud exchange 100 having one or more cloud exchange points 128.

Each of cloud exchange points 128 includes network infrastructure and an operating environment by which cloud customers 108A-108D (collectively, "cloud customers 108") receive cloud services from multiple cloud service providers 110A-110N (collectively, "cloud service providers 110"). Cloud customers 108 may receive cloud-based services directly via a layer 3 peering and physical connection to one of cloud exchange points 128 or indirectly via one of network service providers 106A-106B (collectively, "NSPs 106," or alternatively, "carriers 106"). NSPs 106 provide "cloud transit" by maintaining a physical presence within one or more of cloud exchange points 128 and aggregating layer 3 access from one or customers 108. NSPs 106 may peer, at layer 3, directly with one or more cloud exchange points 128 and in so doing offer indirect layer 3 connectivity and peering to one or more customers 108 by which customers 108 may obtain cloud services from the cloud exchange 100. Each of cloud exchange points 128, in the example of FIG. 1, is assigned a different autonomous system number (ASN). For example, cloud exchange point 128A is assigned ASN 1, cloud exchange point 128B is assigned ASN 2, and so forth. Each cloud exchange point 128 is thus a next hop in a path vector routing protocol (e.g., BGP) path from cloud service providers 110 to customers 108. As a result, each cloud exchange point 128 may, despite not being a transit network having one or more wide area network links and concomitant Internet access and transit policies, peer with multiple different autonomous systems via external BGP (eBGP) or other exterior gateway routing protocol in order to exchange, aggregate, and route service traffic from one or more cloud service providers 110 to customers. In other words, cloud exchange points 128 may internalize the eBGP peering relationships that cloud service providers 110 and customers 108 would maintain on a pair-wise basis. Instead, a customer 108 may configure a single eBGP peering relationship with a cloud exchange point 128 and receive, via the cloud exchange, multiple cloud services from one or more cloud service providers 110. While described herein primarily with respect to eBGP or other layer 3 routing protocol peering between cloud exchange points and customer, NSP, or cloud service provider networks, the cloud exchange points may learn routes from these networks in other way, such as by static configuration, or via Routing Information Protocol (RIP), Open Shortest Path First (OSPF), Intermediate System-to-Intermediate System (IS-IS), or other route distribution protocol.

As examples of the above, customer 108C is illustrated as having contracted with a cloud exchange provider for cloud exchange 100 to directly access layer 3 cloud services via cloud exchange points 128C. In this way, customer 108D receives redundant layer 3 connectivity to cloud service provider 110A, for instance. Customer 108C, in contrast, is illustrated as having contracted with the cloud exchange provider for cloud exchange 100 to directly access layer 3 cloud services via cloud exchange point 128C and also to have contracted with NSP 106B to access layer 3 cloud services via a transit network of the NSP 106B. Customer 108B is illustrated as having contracted with multiple NSPs 106A, 106B to have redundant cloud access to cloud exchange points 128A, 128B via respective transit networks of the NSPs 106A, 106B. The contracts described above are instantiated in network infrastructure of the cloud exchange points 128 by L3 peering configurations within switching devices of NSPs 106 and cloud exchange points 128 and L3 connections, e.g., layer 3 virtual circuits, established within cloud exchange points 128 to interconnect cloud service provider 110 networks to NSPs 106 networks and customer 108 networks, all having at least one port offering connectivity within one or more of the cloud exchange points 128.

In some examples, cloud exchange 100 allows a corresponding one of customer customers 108A, 108B of any network service providers (NSPs) or "carriers" 106A-106B (collectively, "carriers 106") or other cloud customers including customers 108C to be directly cross-connected, via a virtual layer 2 (L2) or layer 3 (L3) connection to any other customer network and/or to any of CSPs 110, thereby allowing direct exchange of network traffic among the customer networks and CSPs 110.

Carriers 106 may each represent a network service provider that is associated with a transit network by which network subscribers of the carrier 106 may access cloud services offered by CSPs 110 via the cloud exchange 100. In general, customers of CSPs 110 may include network carriers, large enterprises, managed service providers (MSPs), as well as Software-as-a-Service (SaaS), Platform-aaS (PaaS), Infrastructure-aaS (IaaS), Virtualization-aaS (VaaS), and data Storage-aaS (dSaaS) customers for such cloud-based services as are offered by the CSPs 110 via the cloud exchange 100.

In this way, cloud exchange 100 streamlines and simplifies the process of partnering CSPs 110 and customers (via carriers 106 or directly) in a transparent and neutral manner. One example application of cloud exchange 100 is a co-location and interconnection data center in which CSPs 110 and carriers 106 and/or customers 108 may already have network presence, such as by having one or more accessible ports available for interconnection within the data center, which may represent any of cloud exchange points 128. This allows the participating carriers, customers, and CSPs to have a wide range of interconnectivity options within the same facility. A carrier/customer may in this way have options to create many-to-many interconnections with only a one-time hook up to one or more cloud exchange points 128. In other words, instead of having to establish separate connections across transit networks to access different cloud service providers or different cloud services of one or more cloud service providers, cloud exchange 100 allows customers to interconnect to multiple CSPs and cloud services.

In accordance with techniques described herein, cloud exchange 100 includes a programmable network platform 120 for dynamically programming cloud exchange 100 to responsively and assuredly fulfill service requests that encapsulate business requirements for services provided by cloud exchange 100 and/or cloud service providers 110 coupled to the cloud exchange 100. The programmable network platform 120 as described herein may, as a result, orchestrate a business-level service across heterogeneous cloud service providers 110 according to well-defined service policies, quality of service policies, service level agreements, and costs, and further according to a service topology for the business-level service.

The programmable network platform 120 enables the cloud service provider that administers the cloud exchange 100 to dynamically configure and manage the cloud exchange 100 to, for instance, facilitate virtual connections for cloud-based services delivery from multiple cloud service providers 110 to one or more cloud customers 108. The cloud exchange 100 may enable cloud customers 108 to bypass the public Internet to directly connect to cloud services providers 110 so as to improve performance, reduce costs, increase the security and privacy of the connections, and leverage cloud computing for additional applications. In this way, enterprises, network carriers, and SaaS customers, for instance, can at least in some aspects integrate cloud services with their internal applications as if such services are part of or otherwise directly coupled to their own data center network.

Programmable network platform 120 may represent an application executing within one or more data centers of the cloud exchange 100 or alternatively, off-site at a back office or branch of the cloud provider (for instance). Programmable network platform 120 may be distributed in whole or in part among the data centers, each data center associated with a different cloud exchange point 128 to make up the cloud exchange 100. Although shown as administering a single cloud exchange 100, programmable network platform 120 may control service provisioning for multiple different cloud exchanges. Alternatively or additionally, multiple separate instances of the programmable network platform 120 may control service provisioning for respective multiple different cloud exchanges.

In the illustrated example, programmable network platform 120 includes a service interface (or "service API") 114 that defines the methods, fields, and/or other software primitives by which applications may invoke the programmable network platform 120. The service interface 114 may allow carriers 106, customers 108, cloud service providers 110, and/or the cloud exchange provider programmable access to capabilities and assets of the cloud exchange 100.

For example and as further described herein, the service interface 114 may facilitate machine-to-machine communication to enable dynamic provisioning of virtual circuits in the cloud exchange for interconnecting customer and cloud service provider networks. In this way, the programmable network platform 120 enables the automation of aspects of cloud services provisioning. For example, the service interface 114 may provide an automated and seamless way for customers to establish, de-install and manage interconnection with multiple, different cloud providers participating in the cloud exchange.

Further example details of a cloud-based services exchange can be found in U.S. Provisional Patent Application 62/149,374, filed Apr. 17, 2015 and entitled "Cloud-Based Services Exchange;" and in U.S. Provisional Patent Application 62/072,976, filed Oct. 30, 2014 and entitled "INTERCONNECTION PLATFORM FOR REAL-TIME CONFIGURATION AND MANAGEMENT OF A CLOUD-BASED SERVICES EXCHANGE;" each of which are incorporated herein by reference in their respective entireties.

Figure 2:
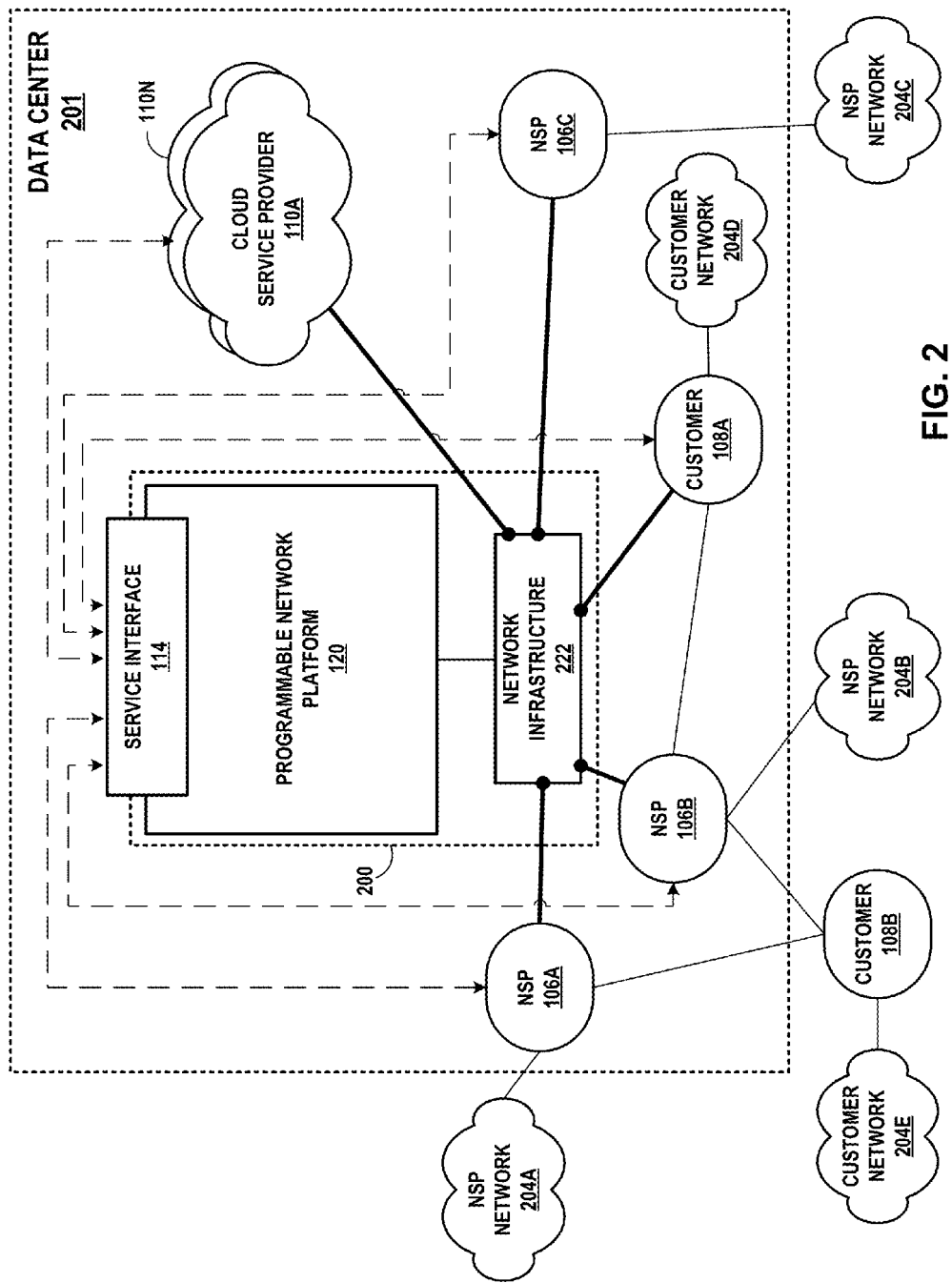
FIG. 2 is a block diagram illustrating a high-level view of a data center that provides an operating environment for a cloud-based services exchange, according to techniques described herein.

FIG. 2 is a block diagram illustrating a high-level view of a data center 201 that provides an operating environment for a cloud-based services exchange 200, according to techniques described herein. Cloud-based services exchange 200 ("cloud exchange 200") allows a corresponding one of customer networks 204D, 204E and NSP networks 204A-204C (collectively, "'private' or 'carrier' networks 204") of any NSPs 106A-106C or other cloud customers including customers 108A, 108B to be directly cross-connected, via a layer 3 (L3) or layer 2 (L2) connection to any other customer network and/or to any of cloud service providers 110A-110N, thereby allowing exchange of cloud service traffic among the customer networks and CSPs 110. Data center 201 may be entirely located within a centralized area, such as a warehouse or localized data center complex, and provide power, cabling, security, and other services to NSPs, customers, and cloud service providers that locate their respective networks within the data center 201 (e.g., for co-location) and/or connect to the data center 201 by one or more external links.

Network service providers 106 may each represent a network service provider that is associated with a transit network by which network subscribers of the NSP 106 may access cloud services offered by CSPs 110 via the cloud exchange 200. In general, customers of CSPs 110 may include network carriers, large enterprises, managed service providers (MSPs), as well as Software-as-a-Service (SaaS), Platform-aaS (PaaS), Infrastructure-aaS (IaaS), Virtualization-aaS (VaaS), and data Storage-aaS (dSaaS) customers for such cloud-based services as are offered by the CSPs 110 via the cloud exchange 200.

In this way, cloud exchange 200 streamlines and simplifies the process of partnering CSPs 110 and customers 108 (indirectly via NSPs 106 or directly) in a transparent and neutral manner. One example application of cloud exchange 200 is a co-location and interconnection data center in which CSPs 110, NSPs 106 and/or customers 108 may already have network presence, such as by having one or more accessible ports available for interconnection within the data center. This allows the participating carriers, customers, and CSPs to have a wide range of interconnectivity options in the same facility. Cloud exchange 200 of data center 201 includes network infrastructure 222 that provides a L2/L3 switching fabric by which CSPs 110 and customers/NSPs interconnect. This enables an NSP/customer to have options to create many-to-many interconnections with only a one-time hook up to the switching network and underlying network infrastructure 222 that presents an interconnection platform for of cloud exchange 200. In other words, instead of having to establish separate connections across transit networks to access different cloud service providers or different cloud services of one or more cloud service providers, cloud exchange 200 allows customers to interconnect to multiple CSPs and cloud services using network infrastructure 222 within data center 201, which may represent any of the edge networks described in this disclosure, at least in part.

By being connected to and utilizing cloud exchange 200, customers can purchase services and reach out to many end users in many different geographical areas without incurring the same expenses typically associated with installing and maintaining multiple virtual connections with multiple CSPs 110. For example, NSP 106A can expand its services using network 204B of NSP 106B. By connecting to cloud exchange 200, a NSP 106 may be able to generate additional revenue by offering to sell its network services to the other carriers. For example, NSP 106C can offer the opportunity to use NSP network 204C to the other NSPs.

Cloud exchange 200 includes an programmable network platform 120 that exposes at least one service interfaces, which may include in some examples and are alternatively referred to herein as application programming interfaces (APIs) in that the APIs define the methods, fields, and/or other software primitives by which applications may invoke the programmable network platform 120. The software interfaces allow NSPs 206 and customers 108 programmable access to capabilities and assets of the cloud exchange 200. The programmable network platform 120 may alternatively be referred to as a controller, provisioning platform, provisioning system, service orchestration system, etc., for establishing end-to-end services including, e.g., connectivity between customers and cloud service providers according to techniques described herein.

On the buyer side, the software interfaces presented by the underlying interconnect platform provide an extensible framework that allows software developers associated with the customers of cloud exchange 200 (e.g., customers 108 and NSPs 206) to create software applications that allow and leverage access to the programmable network platform 120 by which the applications may request that the cloud exchange 200 establish connectivity between the customer and cloud services offered by any of the CSPs 110. For example, these buyer-side software interfaces may allow customer applications for NSPs and enterprise customers, e.g., to obtain authorization to access the cloud exchange, obtain information regarding available cloud services, obtain active ports and metro area details for the customer, create virtual circuits of varying bandwidth to access cloud services, including dynamic selection of bandwidth based on a purchased cloud service to create on-demand and need based virtual circuits to cloud service providers, delete virtual circuits, obtain active virtual circuit information, obtain details surrounding CSPs partnered with the cloud exchange provider, obtain customized analytics data, validate partner access to interconnection assets, and assure service delivery.

On the cloud service provider (seller) side, the software interfaces may allow software developers associated with cloud providers to manage their cloud services and to enable customers to connect to their cloud services. For example, these seller-side software interfaces may allow cloud service provider applications to obtain authorization to access the cloud exchange, obtain information regarding available cloud services, obtain active ports and metro area details for the provider, obtain active port details in a given data center for the provider, approve or reject virtual circuits of varying bandwidth created by customers for the purpose of accessing cloud services, obtain virtual circuits pending addition and confirm addition of virtual circuits, obtain virtual circuits pending deletion and confirm deletion of virtual circuits, obtain customized analytics data, validate partner access to interconnection assets, and assure service delivery.

As further described herein, the service interface 114 facilitates machine-to-machine communication to enable dynamic service provisioning and service delivery assurance. In this way, the programmable network platform 120 enables the automation of aspects of cloud services provisioning. For example, the software interfaces may provide an automated and seamless way for customers to establish, de-install and manage interconnection with multiple, different cloud providers participating in the cloud exchange. The programmable network platform 120 may in various examples execute on one or virtual machines and/or real servers of data center 201, or off-site.

In the example of FIG. 2, network infrastructure 222 represents the cloud exchange switching fabric and includes multiple ports that may be dynamically interconnected with virtual circuits by, e.g., invoking service interface 114 of the programmable network platform 120. Each of the ports is associated with one of carriers 106, customers 108, and CSPs 110.

Figure 3A:
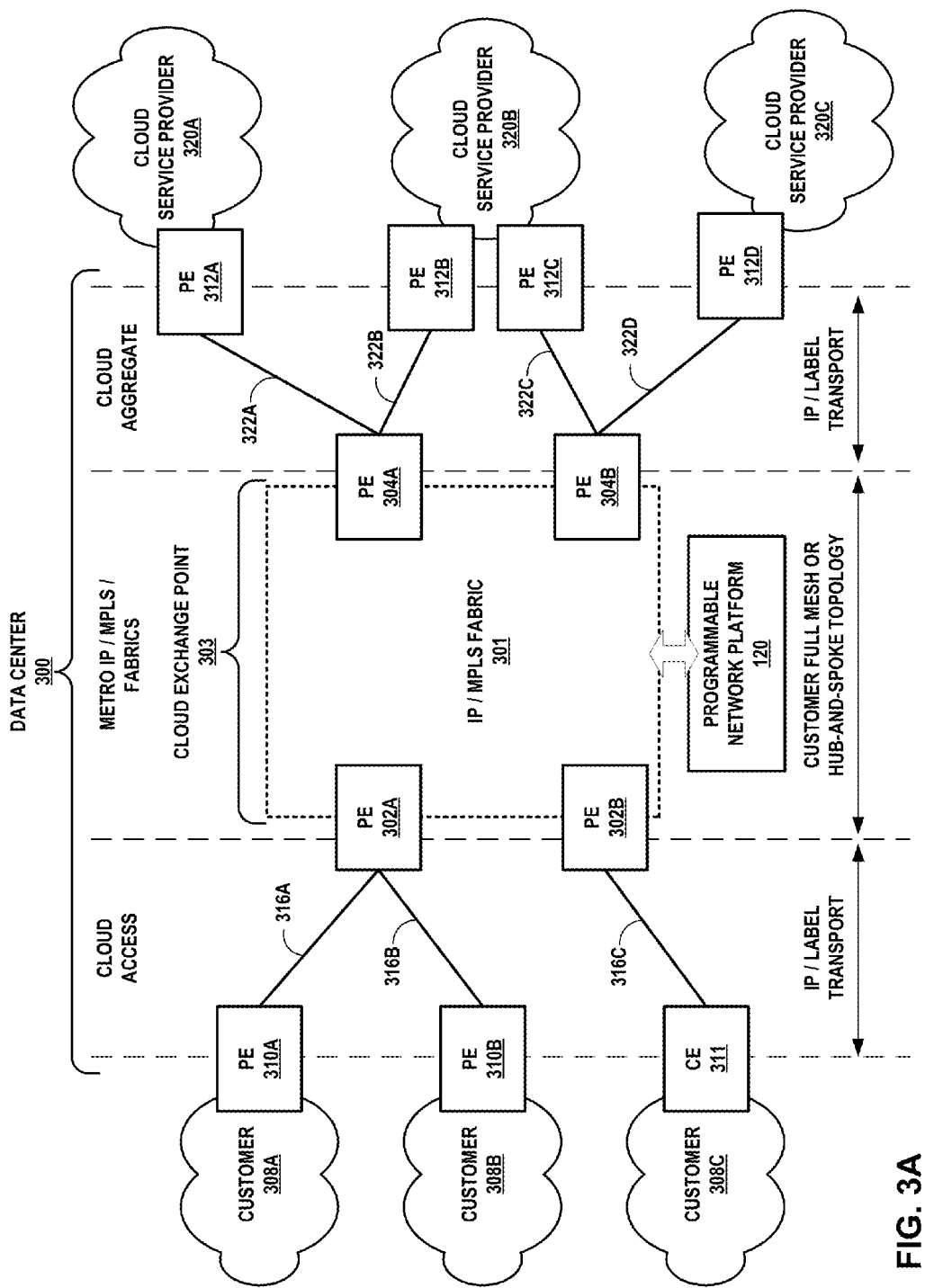
FIGS. 3A-3B are block diagrams illustrating example network infrastructure and service provisioning by a programmable network platform for a cloud exchange that aggregates the cloud services of multiple cloud service providers for provisioning to customers of the cloud exchange provider and aggregates access for multiple customers to one or more cloud service providers, in accordance with techniques described in this disclosure.
Figure 3B:
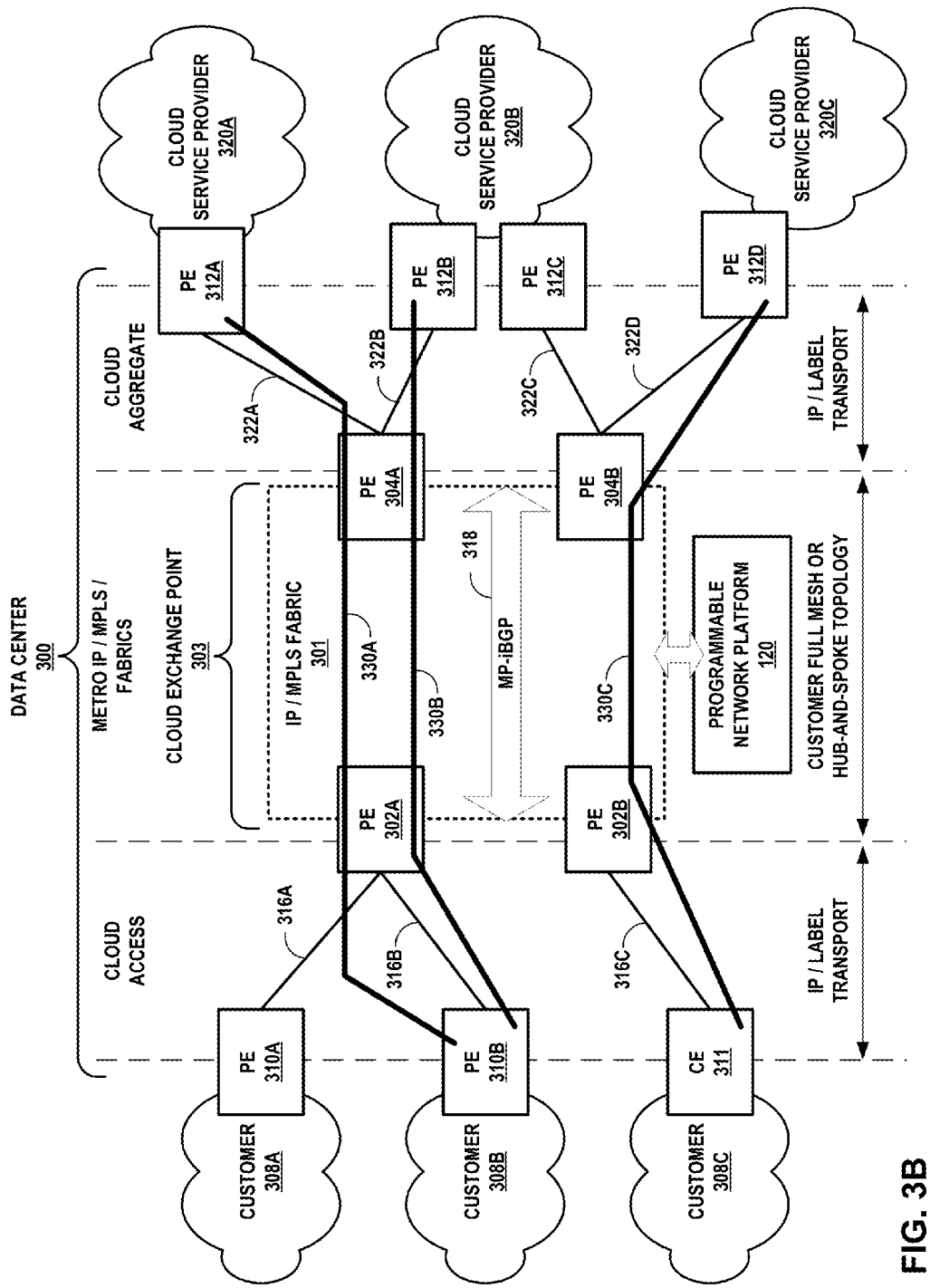

FIGS. 3A-3B are block diagrams illustrating example network infrastructure and service provisioning by a programmable network platform for a cloud exchange that aggregates the cloud services of multiple cloud service providers for provisioning to customers of the cloud exchange provider and aggregates access for multiple customers to one or more cloud service providers, in accordance with techniques described in this disclosure. In this example, customer networks 308A-308C (collectively, "customer networks 308"), each associated with a different customer, access a cloud exchange point within a data center 300 in order receive aggregated cloud services from one or more cloud service provider networks 320, each associated with a different cloud service provider 110. Customer networks 308 each include endpoint devices that consume cloud services provided by cloud service provider network 320. Example endpoint devices include servers, smart phones, television set-top boxes, workstations, laptop/tablet computers, video gaming systems, teleconferencing systems, media players, and so forth.

Customer networks 308A-308B include respective provider edge/autonomous system border routers (PE/ASBRs) 310A-310B. Each of PE/ASBRs 310A, 310B may execute exterior gateway routing protocols to peer with one of PE routers 302A-302B ("PE routers 302" or more simply "PEs 302") over one of access links 316A-316B (collectively, "access links 316"). In the illustrated examples, each of access links 316 represents a transit link between an edge router of a customer network 308 and an edge router (or autonomous system border router) of cloud exchange point 303. For example, PE 310A and PE 302A may directly peer via an exterior gateway protocol, e.g., exterior BGP, to exchange L3 routes over access link 316A and to exchange L3 data traffic between customer network 308A and cloud service provider networks 320. Access links 316 may in some cases represent and alternatively be referred to as attachment circuits for IP-VPNs configured in IP/MPLS fabric 301, as described in further detail below. Access links 316 may in some cases each include a direct physical connection between at least one port of a customer network 308 and at least one port of cloud exchange point 303, with no intervening transit network. Access links 316 may operate over a VLAN or a stacked VLAN (e.g., QinQ), a VxLAN, an LSP, a GRE tunnel, or other type of tunnel.

While illustrated and primarily described with respect to L3 connectivity, PE routers 302 may additionally offer, via access links 316, L2 connectivity between customer networks 308 and cloud service provider networks 320. For example, a port of PE router 302A may be configured with an L2 interface that provides, to customer network 308A, L2 connectivity to cloud service provider 320A via access link 316A, with the cloud service provider 320A router 312A coupled to a port of PE router 304A that is also configured with an L2 interface. The port of PE router 302A may be additionally configured with an L3 interface that provides, to customer network 308A, L3 connectivity to cloud service provider 320B via access links 316A. PE 302A may be configured with multiple L2 and/or L3 sub-interfaces such that customer 308A may be provided, by the cloud exchange provider, with a one-to-many connection to multiple cloud service providers 320.

To create an L2 interconnection between a customer network 308 and a cloud service provider network 320, in some examples, IP/MPLS fabric 301 is configured with an L2 bridge domain (e.g., an L2 virtual private network (L2VPN) such as a virtual private LAN service (VPLS), E-LINE, or E-LAN) to bridge L2 traffic between a customer-facing port of PEs 302 and a CSP-facing port of cloud service providers 320. In some cases, a cloud service provider 320 and customer 308 may have access links to the same PE router 302, 304, which bridges the L2 traffic using the bridge domain.

To create an L3 interconnection between a customer network 308 and a cloud service provider network 320, in some examples, IP/MPLS fabric 301 is configured with a L3 virtual routing and forwarding instances (VRFs), as described in further detail below with respect to FIG. 4.

Each of access links 316 and aggregation links 322 may include a network interface device (NID) that connects customer network 308 or cloud service provider 328 to a network link between the NID and one of PE routers 302, 304. Each of access links 316 and aggregation links 322 may represent or include any of a number of different types of links that provide L2 and/or L3 connectivity.

In this example, customer network 308C is not an autonomous system having an autonomous system number. Customer network 308C may represent an enterprise, network service provider, or other customer network that is within the routing footprint of the cloud exchange point. Customer network includes a customer edge (CE) device 311 that may execute exterior gateway routing protocols to peer with PE router 302B over access link 316C. In various examples, any of PEs 310A-310B may alternatively be or otherwise represent CE devices.

Access links 316 include physical links. PE/ASBRs 310A-310B, CE device 311, and PE routers 302A-302B exchange L2/L3 packets via access links 316. In this respect, access links 316 constitute transport links for cloud access via cloud exchange point 303. Cloud exchange point 303 may represent an example of any of cloud exchange points 128. Data center 300 may represent an example of data center 201.

Cloud exchange point 303, in some examples, aggregates customers 308 access to the cloud exchange point 303 and thence to any one or more cloud service providers 320. FIGS. 3A-3B, e.g., illustrate access links 316A-316B connecting respective customer networks 308A-308B to PE router 302A of cloud exchange point 303 and access link 316C connecting customer network 308C to PE router 302B. Any one or more of PE routers 302, 304 may comprise ASBRs. PE routers 302, 304 and IP/MPLS fabric 301 may be configured according to techniques described herein to interconnect any of access links 316 to any of cloud aggregation links 322. As a result, cloud service provider network 320A, e.g., needs only to have configured a single cloud aggregate link (here, access link 322A) in order to provide services to multiple customer networks 308. That is, the cloud service provider operating cloud service provider network 302A does not need to provision and configure separate service links from cloud service provider network 302A to each of PE routers 310, 311, for instance, in order to provide services to each of customer network 308. Cloud exchange point 303 may instead cross-connect cloud aggregation link 322A and PE 312A of cloud service provider network 320A to multiple cloud access links 316 to provide layer 3 peering and network reachability for the cloud services delivery.

In addition, a single customer network, e.g., customer network 308A, need only to have configured a single cloud access link (here, access link 316A) to the cloud exchange point 303 within data center 300 in order to obtain services from multiple cloud service provider networks 320 offering cloud services via the cloud exchange point 303. That is, the customer or network service provider operating customer network 308A does not need to provision and configure separate service links connecting customer network 308A to different PE routers 312, for instance, in order to obtain services from multiple cloud service provider networks 320. Cloud exchange point 303 may instead cross-connect cloud access link 316A (again, as one example) to multiple cloud aggregate links 322 to provide layer 3 peering and network reachability for the cloud services delivery to customer network 308A.

Cloud service provider networks 320 each includes servers configured to provide one or more cloud services to users. These services may be categorized according to service types, which may include for examples, applications/software, platforms, infrastructure, virtualization, and servers and data storage. Example cloud services may include content/media delivery, cloud-based storage, cloud computing, online gaming, IT services, etc.

Cloud service provider networks 320 include PE routers 312A-312D that each executes an exterior gateway routing protocol, e.g., eBGP, to exchange routes with PE routers 304A-304B (collectively, "PE routers 304") of cloud exchange point 303. Each of cloud service provider networks 320 may represent a public, private, or hybrid cloud. Each of cloud service provider networks 320 may have an assigned autonomous system number or be part of the autonomous system footprint of cloud exchange point 303.

In the illustrated example, an Internet Protocol/Multiprotocol label switching (IP/MPLS) fabric 301 interconnects PEs 302 and PEs 304. IP/MPLS fabric 301 include one or more switching and routing devices, including PEs 302, 304, that provide IP/MPLS switching and routing of IP packets to form an IP backbone. In some example, IP/MPLS fabric 301 may implement one or more different tunneling protocols (i.e., other than MPLS) to route traffic among PE routers and/or associate the traffic with different IP-VPNs. In accordance with techniques described herein, IP/MPLS fabric 301 implement IP virtual private networks (IP-VPNs) to connect any of customers 308 with multiple cloud service provider networks 320 to provide a data center-based 'transport' and layer 3 cross-connect. Whereas service provider-based IP backbone networks require wide-area network (WAN) connections with limited bandwidth to transport service traffic from layer 3 services providers to customers, the cloud exchange point 303 as described herein 'transports' service traffic and cross-connects cloud service providers 320 to customers 308 within the high-bandwidth local environment of data center 300 provided by a data center-based IP/MPLS fabric 301. In some examples, IP/MPLS fabric 301 implements IP-VPNs using techniques described in Rosen & Rekhter, "BGP/MPLS IP Virtual Private Networks (VPNs)," Request for Comments 4364, February 2006, Internet Engineering Task Force (IETF) Network Working Group, the entire contents of which is incorporated by reference herein. In some example configurations, a customer network 308 and cloud service provider network 320 may connect via respective links to the same PE router of IP/MPLS fabric 301.

Access links 316 and aggregation links 322 may include attachment circuits that associate traffic, exchanged with the connected customer network 308 or cloud service provider network 320, with virtual routing and forwarding instances (VRFs) configured in PEs 302, 304 and corresponding to IP-VPNs operating over IP/MPLS fabric 301. For example, PE 302A may exchange IP packets with PE 310A on a bidirectional label-switched path (LSP) operating over access link 316A, the LSP being an attachment circuit for a VRF configured in PE 302A. As another example, PE 304A may exchange IP packets with PE 312A on a bidirectional label-switched path (LSP) operating over access link 322A, the LSP being an attachment circuit for a VRF configured in PE 304A. Each VRF may include or represent a different routing and forwarding table with distinct routes.

PE routers 302, 304 of IP/MPLS fabric 301 may be configured in respective hub-and-spoke arrangements for cloud services, with PEs 304 implementing cloud service hubs and PEs 302 being configured as spokes of the hubs (for various hub-and-spoke instances/arrangements). A hub-and-spoke arrangement ensures that service traffic is enabled to flow between a hub PE and any of the spoke PEs, but not directly between different spoke PEs. As described further below, in a hub-and-spoke arrangement for data center-based IP/MPLS fabric 301 and for southbound service traffic (i.e., from a CSP to a customer) PEs 302 advertise routes, received from PEs 310, to PEs 304, which advertise the routes to PEs 312. For northbound service traffic (i.e., from a customer to a CSP), PEs 304 advertise routes, received from PEs 312, to PEs 302, which advertise the routes to PEs 310.

For some customers of cloud exchange point 303, the cloud exchange point 303 provider may configure a full mesh arrangement whereby a set of PEs 302, 304 each couple to a different customer site network for the customer. In such cases, the IP/MPLS fabric 301 implements a layer 3

VPN (L3VPN) for cage-to-cage or redundancy traffic (also known as east-west or horizontal traffic). The L3VPN may effectuate a closed user group whereby each customer site network can send traffic to one another but cannot send or receive traffic outside of the L3VPN.

PE routers may couple to one another according to a peer model without use of overlay networks. That is, PEs 310 and PEs 312 may not peer directly with one another to exchange routes, but rather indirectly exchange routes via IP/MPLS fabric 301. In the example of FIG. 3B, cloud exchange point 303 is configured to implement multiple layer 3 virtual circuits 330A-330C (collectively, "virtual circuits 330") to interconnect customer network 308 and cloud service provider networks 322 with end-to-end IP paths. Each of cloud service providers 320 and customers 308 may be an endpoint for multiple virtual circuits 330, with multiple virtual circuits 330 traversing one or more attachment circuits between a PE/PE or PE/CE pair for the IP/MPLS fabric 301 and the CSP/customer. A virtual circuit 330 represents a layer 3 path through IP/MPLS fabric 301 between an attachment circuit connecting a customer network to the fabric 301 and an attachment circuit connecting a cloud service provider network to the fabric 301. Each virtual circuit 330 may include at least one tunnel (e.g., an LSP and/or Generic Route Encapsulation (GRE) tunnel) having endpoints at PEs 302, 304. PEs 302, 304 may establish a full mesh of tunnels interconnecting one another.

Each virtual circuit 330 may include a different hub-and-spoke network configured in IP/MPLS network 301 having PE routers 302, 304 exchanging routes using a full or partial mesh of border gateway protocol peering sessions, in this example a full mesh of Multiprotocol Interior Border Gateway Protocol (MP-iBGP) peering sessions. MP-iBGP or simply MP-BGP is an example of a protocol by which routers exchange labeled routes to implement MPLS-based VPNs. However, PEs 302, 304 may exchange routes to implement IP-VPNs using other techniques and/or protocols.

In the example of virtual circuit 330A, PE router 312A of cloud service provider network 320A may send a route for cloud service provider network 320A to PE 304A via a routing protocol (e.g., eBGP) peering connection with PE 304A. PE 304A associates the route with a hub-and-spoke network, which may have an associated VRF, that includes spoke PE router 302A. PE 304A then exports the route to PE router 302A; PE router 304A may export the route specifying PE router 304A as the next hop router, along with a label identifying the hub-and-spoke network. PE router 302A sends the route to PE router 310B via a routing protocol connection with PE 310B. PE router 302A may send the route after adding an autonomous system number of the cloud exchange point 303 (e.g., to a BGP autonomous system path (AS_PATH) attribute) and specifying PE router 302A as the next hop router. Cloud exchange point 303 is thus an autonomous system "hop" in the path of the autonomous systems from customers 308 to cloud service providers 320 (and vice-versa), even though the cloud exchange point 303 may be based within a data center. PE router 310B installs the route to a routing database, such as a BGP routing information base (RIB) to provide layer 3 reachability to cloud service provider network 320A. In this way, cloud exchange point 303 "leaks" routes from cloud service provider networks 320 to customer networks 308, without cloud service provider networks 320 to customer networks 308 requiring a direct layer peering connection.

PE routers 310B, 302A, 304A, and 312A may perform a similar operation in the reverse direction to forward routes originated by customer network 308B to PE 312A and thus provide connectivity from cloud service provider network 320A to customer network 308B. In the example of virtual circuit 330B, PE routers 312B, 304A, 302A, and 310B exchange routes for customer network 308B and cloud service provider 320B in a manner similar to that described above for establishing virtual circuit 330B. As a result, cloud exchange point 303 within data center 300 internalizes the peering connections that would otherwise be established between PE 310B and each of PEs 312A, 312B so as to perform cloud aggregation for multiple layer 3 cloud services provided by different cloud service provider networks 320A, 320B and deliver the multiple, aggregated layer 3 cloud services to a customer network 308B having a single access link 316B to the cloud exchange point 303. Absent the techniques described herein, fully interconnecting customer networks 308 and cloud service provider networks 320 would require 3×3 peering connections between each of PEs 310 and at least one of PEs 312 for each of cloud service provider networks 320. For instance, PE 310A would require a layer 3 peering connection with each of PEs 312. With the techniques described herein, cloud exchange point 303 may fully interconnect customer networks 308 and cloud service provider networks 320 with one peering connection per site PE (i.e., for each of PEs 310 and PEs 312) by internalizing the layer 3 peering and providing data center-based 'transport' between cloud access and cloud aggregate interfaces.

In examples in which IP/MPLS fabric 301 implements BGP/MPLS IP VPNs or other IP-VPNs that use route targets to control route distribution within the IP backbone, PEs 304 may be configured to import routes from PEs 302 and to export routes received from PEs 312, using different asymmetric route targets. Likewise, PEs 302 may be configured to import routes from PEs 304 and to export routes received from PEs 310 using the asymmetric route targets. Thus, PEs 302, 304 may configured to implement advanced L3VPNs that each includes a basic backbone L3VPN of IP/MPLS fabric 301 together with extranets of any of customer networks 308 and any of cloud service provider networks 320 attached to the basic backbone L3VPN. Each advanced L3VPN constitutes a cloud service delivery network from a cloud service provider network 320 to one or more customer networks 308, and vice-versa. In this way, cloud exchange point 303 enables any cloud service provider network 320 to exchange cloud service traffic with any customer network 308 while internalizing the layer 3 routing protocol peering connections that would otherwise be established between pairs of customer networks 308 and cloud service provider networks 320 for any cloud service connection between a given pair. In other words, the cloud exchange point 303 allows each of customer networks 308 and cloud service provider networks 320 to establish a single (or more for redundancy or other reasons) layer 3 routing protocol peering connection to the data center-based layer 3 cross-connect. By filtering routes from cloud service provider networks 320 to customer networks 308, and vice-versa, PEs 302, 304 thereby control the establishment of virtual circuits 330 and the flow of associated cloud service traffic between customer networks 308 and cloud service provider networks 320 within a data center 300. Routes distributed into MP-iBGP mesh 318 may be VPN-IPv4 routes and be associated with route distinguishers to distinguish routes from different sites having overlapping address spaces.

Programmable network platform 120 may receive service requests for creating, reading, updating, and/or deleting end-to-end services of the cloud exchange point 303. In response, programmable network platform 120 may configure PEs 302, 304 and/or other network infrastructure of IP/MPLS fabric 301 to provision or obtain performance or other operations information regarding the service. Operations for provisioning a service and performed by programmable network platform 120 may include configuring or updating VRFs, installing SDN forwarding information, configuring LSPs or other tunnels, configuring BGP, configuring access links 316 and aggregation links 322, or otherwise modifying the configuration of the IP/MPLS fabric 301. Other operations may include making service requests to an orchestration system for cloud service provider networks 320, as described in further detail below.

Figure 4:
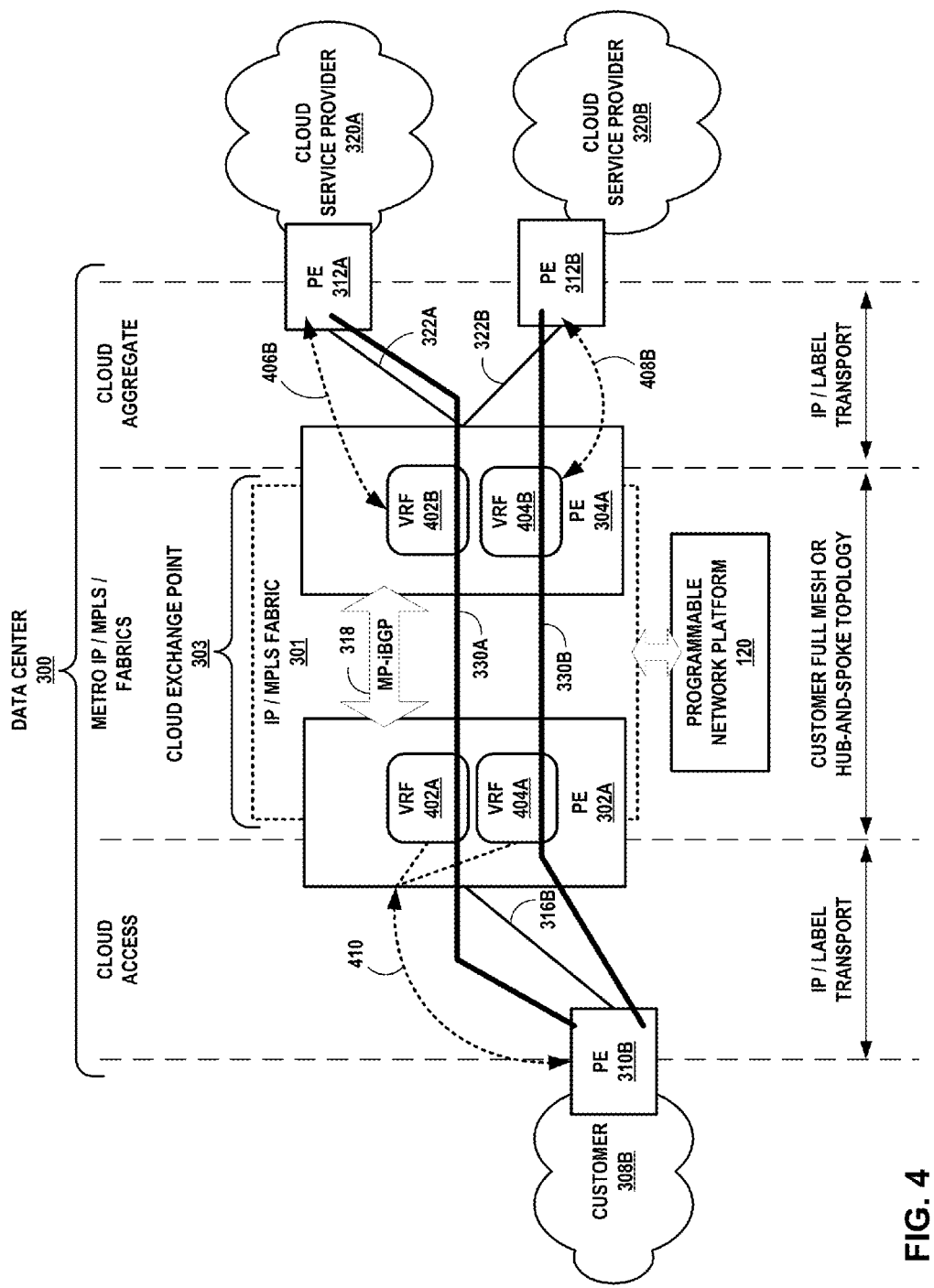
FIG. 4 is a block diagram illustrating an example of a data center-based cloud exchange point in which routers of the cloud exchange point are configured by programmable network platform with VPN routing and forwarding instances for routing and forwarding aggregated service traffic from multiple cloud service provider networks to a customer network, according to techniques described herein.

FIG. 4 is a block diagram illustrating an example of a data center-based cloud exchange point in which routers of the cloud exchange point are configured by programmable network platform 120 with VPN routing and forwarding instances for routing and forwarding aggregated service traffic from multiple cloud service provider networks to a customer network, according to techniques described herein. In this example, to establish virtual circuits 330A-330B, PE routers 302A and 304A of IP/MPLS fabric 301 are configured with VRFs. PE 302A is configured with VRFs 402A and 404A, while PE 304A is configured with VRFs 402B and 404B. VRF 402A is configured to import routes exported by VRF 402B, and VRF 402B is configured to import routes exported by VRF 402A. The configuration may include asymmetric route targets for import/export between VRFs 402A, 402B. VRF 404A is configured to import routes exported by VRF 402B, and VRF 402B is configured to import routes exported by VRF 402A. The configuration may include asymmetric route targets for import/export between VRFs 402A, 402B. This configuration whereby a customer is able to access multiple layer 3 services from different CSPs each associated with separate VRFs to access the layer 3 services provides isolation of respective traffic exchanged with the CSPs. In some examples, PE 302A may be configured with a single VRF to import routes exported by both VRF 402B and VRF 404B. As noted above with respect to FIGS. 3A-3B, PEs 302, 304 may be further configured to bridge layer 2 traffic between customer 308B and cloud service providers 320.

In this example, PE 304A operates BGP or other route distribution protocol peering connections 406B, 408B with respective PEs 312A, 312B to exchange routes with respective cloud service provider networks 320A, 320B. PE 302A operates a BGP or other route distribution protocol peering connection 410 with PE 310B to exchange routes with customer network 308B. In some examples, PEs 302A, 304A may be statically configured with routes for the site networks.

An administrator or a programmable network platform described herein for cloud exchange point 303 may configure PEs 302A, 304A with the VRF 402A-402B, 404A-404B in order to leak routes between PEs 312 and PE 310B and facilitate layer 3 connectivity for end-to-end IP paths illustrated here by virtual circuits 330, while potentially optimizing the end-to-end IP paths by fostering data center-based or at least metro-based connectivity. Cloud exchange point 303 may thus provide dedicated cloud service provider access to customer network 308B by way of private and/or public routes for the cloud service provider networks 320. In the northbound direction, cloud exchange point 303 may provide dedicated cloud service provider distribution to multiple customer networks 308 by way of private and/or public routes for the customer networks 308. Neither PE 310B nor any of PEs 302A, 304A need access to the full Internet BGP routing table in order to reach cloud service provider networks 320 or customer networks 308. Moreover, PEs 302A, 304A may be configured to aggregate customer/CSP routes and/or service traffic based on any one or more of physical, IP, service, and VRFs.

Figure 5:
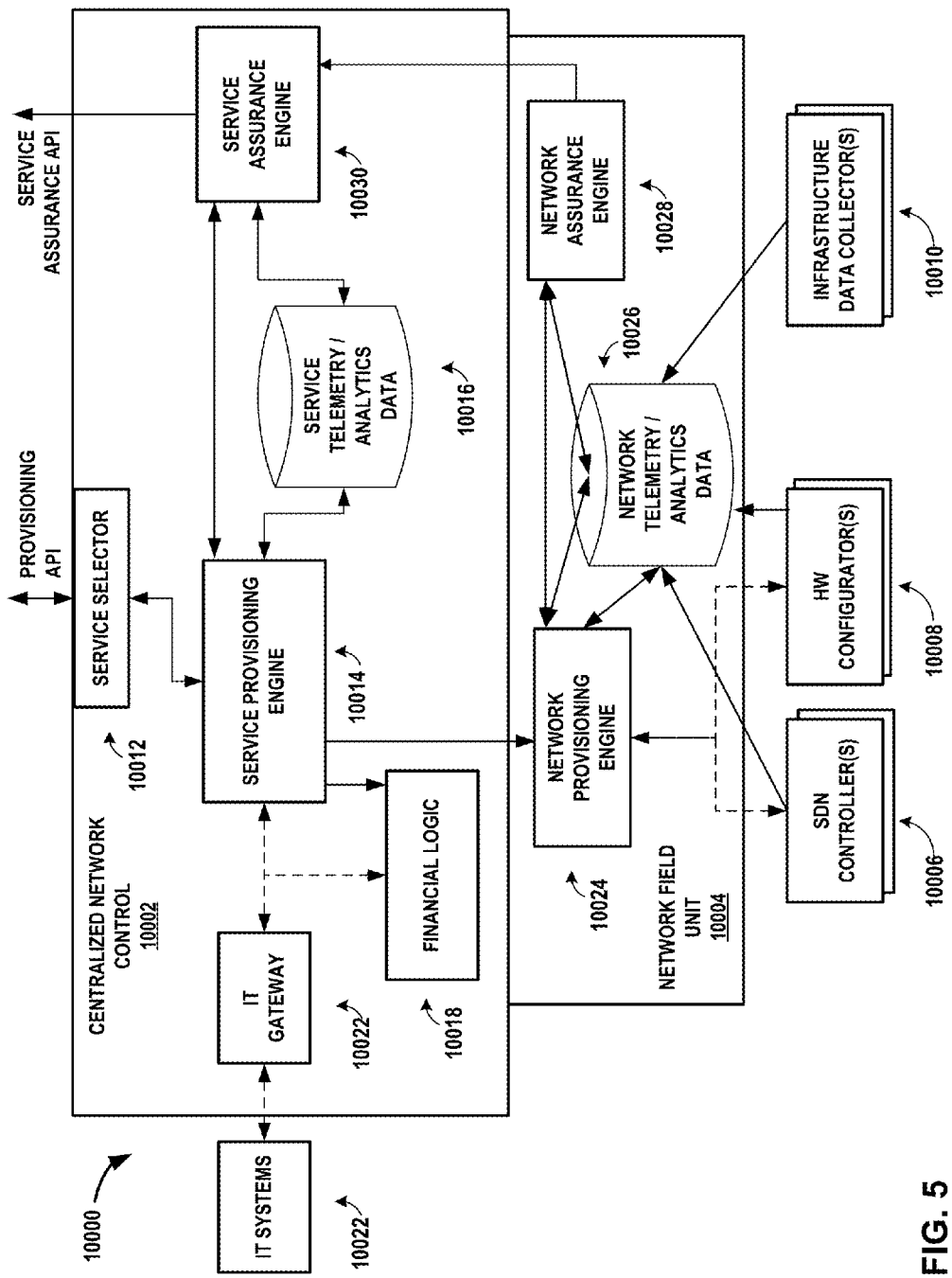
FIG. 5 is a block diagram illustrating a platform for a software controlled network, the platform operating in accordance with one or more techniques of the present disclosure.

FIG. 5 is a block diagram illustrating a platform for a software controlled network, the platform operating in accordance with one or more techniques of the present disclosure. FIG. 5 illustrates a programmable network platform 10000 that includes multiple components, which collectively provide for dynamic configuration and management of a cloud-based services exchange, or "cloud exchange." These components may provide virtual connections for cloud services delivery from multiple cloud service providers to one or more cloud customers. Programmable network platform 10000 includes centralized network control (CNC) system 10002, one or more network field units (NFUs) 10004, software-defined networking (SDN) controller 10006, hardware configurators 10008, infrastructure data collectors 10010, and information technology systems (10010).

Programmable network platform 10000 may provide for the orchestration of a service across multiple service providers and allow one of the service providers to be the service owner in terms of the service monitoring, assurance and billing. Programmable network platform 10000 may provide the process and apparatus for multiple service provider orchestration system to securely communicate with each other to deliver a combined service on demand in a single click manner. Programmable network platform 10000 may represent an example instance of programmable network platform 120 or another programmable network platform, controller, or system described herein for provisioning services and assuring service delivery.

In the example of FIG. 5, CNC system 10002 enables the automation of aspects of cloud services provisioning. As such, CNC system 10002 may provide one or more software interfaces that allow customers to establish, de-install and manage interconnections with multiple, different cloud providers participating in the cloud exchange in an automated and seamless manner. CNC system 10002 may include logic to receive a business service request via an API call and convert that into the necessary business instantiation parameters and network provisioning parameters to be delivered and assured as a business service. CNC system 10002 may be the central intelligent processing unit of the orchestration system (e.g., programmable network platform 10000) and there may be one logical instance of this intelligent logic present per instantiation. CNC system 10002 also has the capability of communicating with a third party orchestration system if needed by the service request. CNC system 10002 may provide service assurance using a Monitor, Analyze, Plan and Execute (MAPE) loop methodology, as further discussed in this disclosure, and is implemented to ensure the service level agreements are adhered to by the service.

Figure 9:
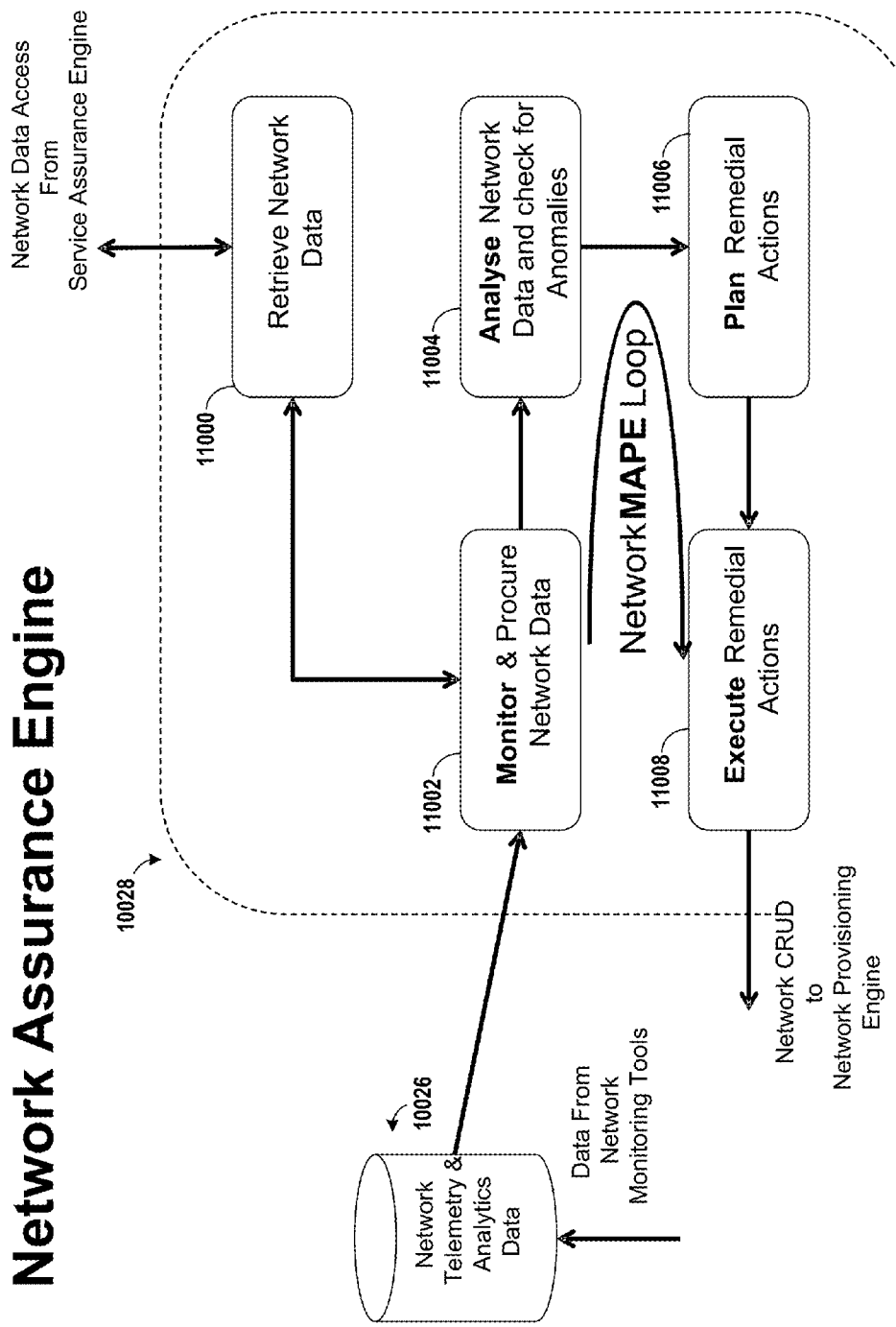
FIG. 9 is a block diagram illustrating an example network assurance engine, in accordance with one or more techniques of the present disclosure.

In some examples, NFU 10004 is implemented as a self-contained unit that receives requests or instructions from CNC system 10002 to configure network infrastructure of a cloud exchange point for one or more services. For instance, NFU 10004 may comprise a combination of hardware and software. In some examples, NFU 10004 may be a virtual machine. In any case, NFU 10004 receives requests or instructions CNC system 10002 based on customer requests submitted to CNC system 10002. As further described below, NFU 10004 may determine whether sufficient resources exist to provide the services requested by CNC system 10002. If sufficient resources exist, NFU 10004 may communicate or otherwise interoperate with SDN controller 10006, hardware configurators 10008, and infrastructure data collectors 10010 to configure the network infrastructure to provide the requested service. NFU 10004 may represent a globally distributed intelligent logical unit that receives network instantiation commands from CNC system 10002 and instantiates and configures the network resource that is needed to deliver the service. NFU 10004 may have the intelligence to deliver and assure network services as per the request of CNC system 10002. NFU 10004 may have its own MAPE loop (e.g., as shown in FIG. 9) to ensure that the network services delivered by the unit is assured for the life cycle of the service.

In some examples, multiple cloud exchange points may be geographically dispersed. Each geographically positioned cloud exchange point may have a corresponding NFU that is geographically positioned at the same location as the respective cloud exchange point. The corresponding NFU may configure and otherwise manage the network infrastructure of the particular geographically-positioned cloud exchange point. In this way, a particular NFU may receive requests or instructions from CNC system 10002 and configure the network infrastructure of the cloud exchange point that is managed by the particular NFU. In some cases, multiple cloud exchange points of a metropolitan area make up a metro-based cloud exchange managed by a single NFU.

NFU 10004 may therefore represent the distributed processing unit of programmable network platform 10000, which provides programmable network platform 10000 with the ability to horizontal scale and deliver and assure services. NFU 10004 is the component of programmable network platform 10000 that may provide the functionality of delivering the services in a vendor agnostic and form factor agnostic manner. As shown in FIG. 5, NFU 10004 has several software components that enable the distributed processing unit to deliver the services.

In order to provision services and virtual connections to cloud customers and cloud service providers, CNC system 10002 includes a service selector 10012. In some examples, service selector 10012 may operate as an API gateway. For example, service selector 10012 may expose software interfaces defined according to one or more APIs. Requests and/or instructions received by service selector 10012 may be include the form of create, read, update, and/or delete (CRUD) requests made with respect to services provided by and/or delivered by the cloud exchange. Applications may invoke endpoints of the APIs provided by service selector 10012, which may in turn invoke service provisioning engine 10014. Service selector 10012 may execute on one or virtual machines and/or real servers, for instance. Although shown as a single element in FIG. 5, service selector 10012 may comprise a cluster of one or more physical and/or virtual computing machines executing on one or more physical processors. In some aspects, service selector 10012 provides a service catalog that describes available services and providers for the available services.

Service provisioning engine 10014 may receive requests to provision services from service selector 10012. Service provisioning engine 10014, in conjunction with network field unit 10004, organizes, directs and integrates underlying hardware and software sub-systems for managing various aspects of service provisioning within the network infrastructure as well as cloud services management. For instance, service provisioning engine 10014 may provide a rule-driven workflow engine that operates between service selector 10012 and the underlying interconnect platform of a cloud exchange that is configured by network field unit 10004. In this way, service provisioning engine 10014 can be invoked via service selector 10012 by customer-proprietary applications, a cloud provider-based customer portal, and/or cloud service provider systems, for direct participation with the programmable network platform of a cloud exchange network infrastructure that is configured by network field unit 10004. As described in further detail below with respect to FIG. 6 et al., service provisioning engine 10014 may include a third-party service connector that communicates with the third party orchestration systems to ensure that the service is adequately networked together to provide the end-to-end cloud-based service fulfillment. As further described below, NFU 10004 may receive instructions and/or requests from CNC system 10002, which NFU 10004 uses to provision services at one or more cloud exchange points.

Service provisioning engine 10014 may query and store service telemetry and analytics data (STAD) 10016 in one or more data stores. STAD 10016 may include metrics about the quantity, type, definition, and consumers of services that are configured by service provisioning engine 10014. STAD 10016 may include analytics information based on raw metrics data from NFU 10004. For instances, analysis information of STAD 10016 may include historical statistics and/or real-time statistics, which may be analyzed on various dimensions, such as consumer, service type, service use, to name only a few examples.

CNC system 10002 may also include financial logic 10018. Financial logic 10018 may store accounting information for customers. For instance, financial logic 10018 may store billing information for customers, such as name, address, phone number, email, to name only a few examples. When service provisioning engine 10014 configures a service for a customer that includes a service charge, financial logic 10018 may store such expense information. In this way, financial logic 10018 may provide an accounting of services purchased by a customer and provide billing for such services.

CNC system 10002 may include Information Technology (IT) gateway 10020 that interfaces with IT systems 100022. IT systems 100022 may include one or more computing devices, such as desktop computers, tablets, smartphones, and servers, to name only a few examples. IT systems 100022 may provide one or more user interfaces to administrators, which may use IT systems 100022 to administer CNC system 10002. IT systems 100022 may, for example, receive user inputs to configure CNC system 10002 and/or NFU 10004. Based on the user inputs, IT systems 100022 may send requests and/or instructions to CNC system 10002, which are received by IT gateway 10020. In some examples, CNC system 10002 may provide or otherwise expose one or more RESTful interfaces that can be called or otherwise invoked by IT systems 100022. IT gateway 10020 may route such instructions or requests to other components within CNC system 10002 for further processing based on the type of requests and/or instructions.

As described above, NFU 10004 may receive requests or instructions from CNC system 10002 to provision one or more services. Network provisioning engine 10024 may receive the requests and/or instructions from service provisioning engine 10014. Network provisioning engine 10024 may determine whether sufficient resources exist to satisfy a request for a service to be configured at a cloud exchange point. In some examples, network provisioning engine 10024 may query one or more components such as SDN controller 10006, hardware configurators 10008, and/or network telemetry and analytics data (NTAD) 10026. If sufficient resources exist to provision a requested service, network provisioning engine 10024 may send instructions and/or requests to one or more of SDN controller 10006 and/or hardware configurators 10008 that cause each respective component to be configured to provision the requested service. As such, network provisioning engine 10024 provides the functionality of selecting the vendor, and form factor in which the service is delivered. Network provisioning engine 10024 also provides the policy manager functionality to ensure the service is delivered in the correct order of operations.

In some examples, network provisioning engine 10024 of NFU 10004 may include a Network Appliance Sizing Engine (not shown) that provides the functionality of ensuring the network appliance is properly sized for the appropriate SLA to be delivered by the appliance. In some examples, NFU 10004 may include a Device Selection and Handler (not shown) that provides the functionality of selecting the correct device to deliver the service, and convert the network commands to the appropriate configuration commands for the selected device. For example NFU 10014 may access a list that describes the capabilities of virtual and/or dedicated appliances within the cloud exchange for providing native services, such as firewall (FW), network address translation (NAT), and deep-packet inspection (DPI), to service traffic traversing the cloud exchange. NFU 10004 may select a device from the list to satisfy the service request, as described in further detail below with respect to FIG. 8, for instance.

Network provisioning engine 10024 may query and store network telemetry and analytics data (NTAD) 10026 in one or more data stores. NTAD 10026 may include metrics about the quantity, type, definition, of network and resource configurations that are configured by NFU 10004. NTAD 10026 may include analytics information from infrastructure data collectors 10010 based on raw metrics data for resources used in a particular service. For instances, analysis information of NTAD 10026 may include historical statistics and/or real-time statistics.

As shown in FIG. 5, one or more SDN controllers 10006 may configure network resources, such as routers, switches, bridges, and the like, which provide the physical infrastructure to carry network traffic through a cloud exchange point. One or more hardware configurators 10008 may configure hardware resources, such as servers or the above-mentioned network resources; resources within servers and network resources including processor allocation, memory allocation; storage appliances; other hardware resources; and software configurations that may be configured to provision services to a customer. One or more infrastructure data collectors 10010 may collect metrics about the quantity, type, definition, of network and resource configurations that are configured by NFU 10004. For instance, infrastructure data collectors 10010 may monitor and measure metrics of network resources and any other resources configured to provision services to a customer. Infrastructure data collectors 10010 may store such metrics in NTAD 10026.

NFU 10004 and CNC system 10002 may include network assurance engine 10028 and service assurance engine 10030, respectively. Network assurance engine 10028 may determine, based on NTAD 10026, whether infrastructure configured to provide services is providing a satisfactory level of service. For example, outages, resource consumption overages, hardware and/or software failures or problems, and other events may affect the quality of services provided by the network infrastructure at a cloud exchange point. Network assurance engine 10028 may monitor NTAD 10026, and in some cases, send information to service assurance engine 10030. In some examples, the information may include alerts if service levels are not being met, or more specifically alerts for outages, resource consumption overages, hardware and/or software failures or problems. In some examples, information sent by network assurance engine 10028 to service assurance engine 10030 may be informational rather than based on a specific event. For instance, network assurance engine 10028 may send information about the performance of infrastructure to service assurance engine on a particular schedule or interval, and/or on continuous or real-time basis. In some examples NTAD 10026 may contain a set of structured and/or unstructured databases that enable the service provisioning engine 10014 and network assurance engine 10028 to appropriately store and retrieve data to support the operation of programmable network platform 10000.

Network assurance engine 10028 may provide the functionality of assuring the network configuration created is assured as per the networking SLAs requested by CNC system 10002. The Network Assurance Engine is comprised of several sub-components that deliver the assurance through a MAPE loop including: (1) Monitoring, which is performed by several data collectors that are programmed to monitor and gather data for a given service; (2) Analyzing, which analyzes the data collected by the data collectors to compare and ensure that the services are compliant with the requested SLAs (3) Planning, which in the event a service or set of services are out of compliance, a planning module will make the decisions if the current non-compliance can be mitigated locally or needs to escalated to the CNC system 10002 for further processing; and (4) Executing, which is based on the decisions taken by the planning module to execute actions in the event the non-compliance can be locally mitigated.

Service assurance engine 10030 may receive information from network assurance engine 10028 and may compare the information with service level information, such as service level agreements, included in STAD 10016. By comparing information about the performance of infrastructure with service level information in STAD 10016, service assurance engine may send service level information to customers using one or more service assurance APIs, and whether such service level agreements are being met. In this way, customers may monitor or otherwise evaluate the quality of service provided by one or more cloud exchange points.

As described above, programmable network platform 10000 may bridge business systems, such as customers and cloud service providers, with operations systems, such as the network infrastructure of one or more cloud exchange points to improve operational efficiency. As such, programmable network platform 10000 may provide improved visibility to monitor and assure the end-to-end service and its components. Accordingly, programmable network platform 10000, unlike conventional systems may include the capability to perform the provisioning and assurance of services across multiple orchestration systems for multiple cloud providers. CNC system 10002 may operate as the master controller that performs the function of receiving a service request that encapsulates the business requirements for the service, and using business, network and partner sub-system logic to instantiate and assure the service. As shown in FIG. 5, CNC system 10002 is made up of multiple different software modules performing different functions of fulfilling a service request. Programmable network platform 10000 may provide a distributed orchestration system for creating services and distributing the intelligence of delivering and assuring services. Additionally, programmable network platform 10000 may provide a distributed system that is able to communicate with third party service orchestration systems and deliver a distributed service, as described in further detail below with respect to FIG. 6.

Programmable network platform 10000 may provide service orchestration of a business level service across heterogeneous service providers. The definition of the service policy, quality, service level agreements and cost as a coordinated service topology may be provided at programmable network platform 10000. Programmable network platform 10000 may define the individual sub-component level topology, policy, SLA and cost in terms of specification and enforcement.

Figure 7:
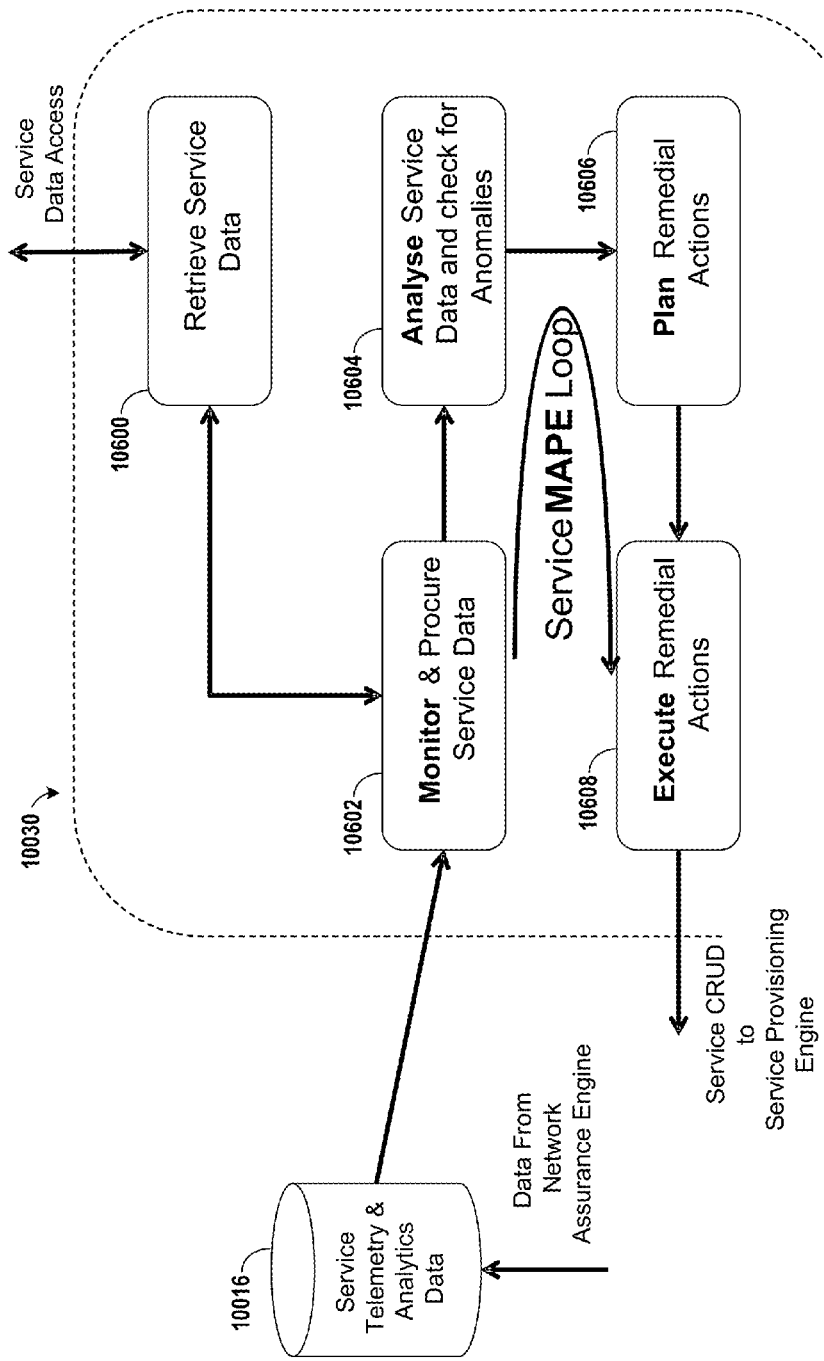
FIG. 7 is a block diagram illustrating an example service assurance engine, in accordance with one or more techniques of the present disclosure.

Programmable network platform 10000 is an intelligent centralized service delivery and assurance system with the ability to have fault mitigation Monitor/Analyze/Plane/Execute (MAPE) loop, as shown in FIGS. 7 and 9 that will ensure the service delivered by the system is assured to adhere the service level agreement for the life cycle of the service. Programmable network platform 10000 not only delivers services that can be offered by its own delivery infrastructure but also has the capability to communicate across other third-party orchestration systems to deliver a combined homogeneous service. Programmable network platform 10000, or more specifically CNC system 10002, may be the central control center for both operations and business related functions to be performed.

NFU 10004 and CNC system 10002 may also fulfill the need for having a distributed orchestration system for creating services and distributing the intelligence of delivering and assuring service. Additionally, NFU 10004 and CNC system 10002 may fulfill the need for the distributed system to be able to communicate with third party service orchestration systems to deliver a distributed service. Programmable network platform 10000 provides the advantage of providing a distributed, horizontally scaling architecture. CNC 10002 and one or more NFUs 10004 may provide the functionality of delivering and assuring a business service into two distinctly separate functions, (1) CNC—may handle the function of converting the business request into service parameters, (2) NFU—may handle the function of converting the service parameters into network parameters and instantiating the service.

Figure 6:
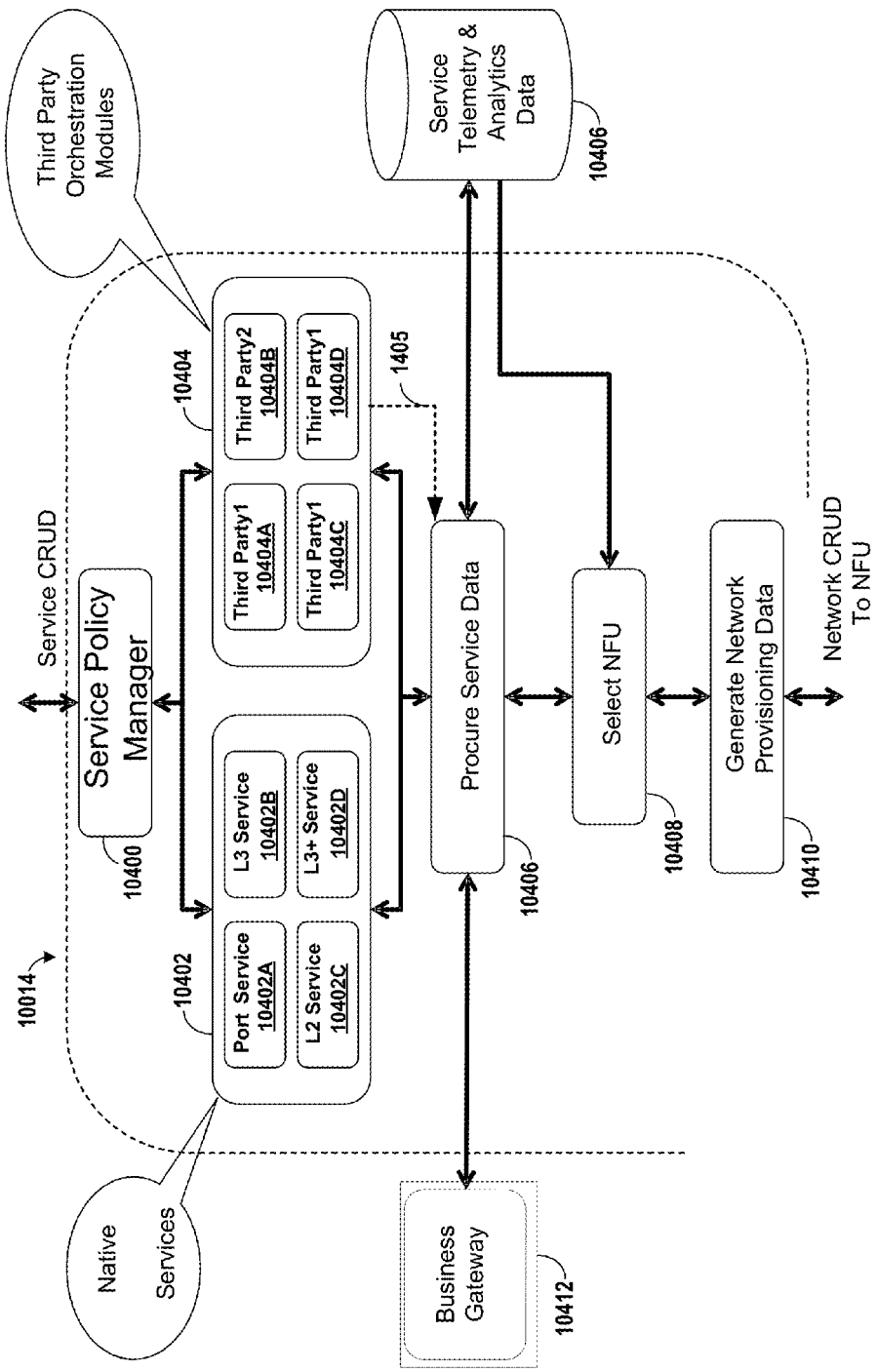
FIG. 6 is a block diagram illustrating an example service provisioning engine, in accordance with one or more techniques of the present disclosure.

FIG. 6 is a block diagram illustrating service provisioning engine 10014 of FIG. 5 in further detail, in accordance with one or more techniques of the present disclosure. As shown in FIG. 6, service provisioning engine 10014 may include a service policy manager 10400. Service policy manager 10400 may receive service requests and/or instructions from other components of CNC system 10002, such as service selector 10012, service assurance engine 10030, financial logic 10018 and IT gateway 10020. Requests and/or instructions received by service policy manager 10400 may take the form of create, read, update, and/or delete (CRUD) requests. Service policy manager 10400 may provide a set of APIs that allow other components of CNC system 1000 to send service requests and/or instructions to service policy manager 10400. Service policy manager 10400 may direct such service requests and/or instructions to other components within service policy manager 10400.

Service provisioning engine 10014 may include native services 10402 and third-party services orchestrated via third-party orchestration modules 10404. Native services 10402 may include services designed and/or implemented by an operator of CNC system 10002. For instance, native services may be used to configure virtual circuits at one or more cloud exchange points. Examples of native services 10402 may include but are not limited to a port service 10402A, one or more layer 3 (L3) connectivity services 10402B, one or more layer 2 (L2) connectivity services 10402C, and one or more connectivity services provided in an OSI layer that is greater than L3 such as Application, Presentation, Session, and Transport layer services ("L3+ services 10402D"). Port service 10402A may identify and/or configure one or more ports to provide one or more services at a cloud exchange point. L2, L3 and L3+ services may refer to the OSI or TCP/IP layer at which a particular service is applied.

In some examples, a programmable network platform described herein may provide for orchestrating a service that involves both native and third-party components as single service while ensuring policy, security, and service level agreement (SLA) consistency. The programmable network platform may orchestrate the third-party service components using a third-party (or "partner") orchestration module (or "plugin"). A third-party orchestration module allows a third-party orchestration system to register its capabilities (e.g., service catalog, policy, security and SLA) with the programmable network platform. The cloud service provider, as the service owner, may use the programmable network platform to direct the third-party orchestration system, via the corresponding third-party orchestration module, as part of the workflow for the service delivery to stand-up and deliver a third-party service for the service.

As a result, the programmable network platform may be adapted and extended by registering (or updating) third-party orchestration modules for any third-party orchestration system. This may allow the cloud service provider that administers the programmable network platform to provide interconnectivity between customers and cloud service providers to also broker and delivery layer 3 services of the cloud service providers to the customers.

As illustrated in FIG. 6, service provisioning engine 10014 may include one or more third-party orchestration modules 10404 to enable orchestration of cloud services by the service provisioning engine 10014. In some examples, third-party orchestration modules 10404 may be designed and/or implemented by respective cloud service providers, other than administrators of a cloud-exchange point. Although designed and implemented by third parties, third-party orchestration modules 10404 are hosted and executed at a cloud exchange point. In this way, third parties may design and implement third-party orchestration modules 10404 that are hosted and executed at a cloud exchange point.

Each of third-party orchestration modules 10404 may present a common interface to the service provisioning engine 10014 for requesting cloud services from the cloud service providers. The interface may include a catalog interface by which a cloud service provider can publish its list of available cloud services, together with available policy, security, SLA parameters, and costs for the cloud services, to the programmable network platform. The programmable network platform may replicate the list of available cloud services for the various cloud service providers to customers via a customer portal. For example, cloud service providers for respective third-party orchestration modules 10404 may each offer a data storage service and publish this offering via the third-party orchestration modules 10404. In turn, the programmable network platform with which a given third-party orchestration module 10404 has registered may invoke the common interface to request orchestration of one of the offered cloud services. The third-party orchestration module 10404 responsively communicates with an orchestration system of the corresponding cloud service provider to cause the cloud service provider network to set up the requested layer 3 cloud service according to service parameters in the request. Such service parameters may include policy, service-specific information specific to the type of layer 3 cloud service (e.g., a data storage size for a dSaaS service), connectivity information (e.g., L3 address for a customer or another cloud service provider network), QoS information, among other parameters.

Upon instantiation of a cloud service requested by the service provisioning engine via a third-party orchestration module 10404A (for instance), the third-party orchestration module 10404A may receive connectivity information that enables the cloud exchange to connect to the instantiated cloud service. This connectivity information, or "network handle," may include, e.g., a layer 3 route to the service; a VxLAN, VLAN, or other tunnel identifier usable by a cloud service provider network-facing cloud exchange router for accessing the cloud service (for instance, forwarding service traffic to the cloud service or identifying service traffic for the cloud service received by the cloud exchange point from the cloud service provider network). The third-party orchestration module 10404A provides the connectivity information 1405 to the service provisioning engine 10014 (e.g., via the common interface), which uses the connectivity information and STAD 10406 to procure service data and eventually to generate the network provisioning data at 10410. STAD 10406 provides service provisioning engine 10014 with indications of services provided. In this way, the cloud exchange provider is absolved from having to establish a cloud service via a corresponding cloud service provider API or cloud service provider portal. Instead, third-party orchestration modules 10404 manage the setup in response to service requests made by the service provisioning engine 10014 via a common interface.

Third-party orchestration module 10404 may be configured with connectivity information for communicating with respective cloud service providers, including respective cloud service provider orchestration systems. Cloud service providers may update third-party orchestration modules 10404 by pushing up-to-date new or modified service catalogs and service pricing information. The cloud exchange provider may therefore avoid having to pull this information from the cloud service providers.

Each of third-party orchestration modules 10404 may represent an application executing on one or more data center servers of the cloud exchange and administered by the cloud exchange provider; a software plugin, module, or linked library; or another machine-executable code executable in conjunction with the programmable network platform and capable of satisfying service requests for third-party orchestration in the manner described above.

By enabling consolidation of the setup and management of cloud services from third-party cloud service providers within the programmable network platform, third-party orchestration modules 10404 allow the cloud service provider to become an authoritative owner of an end-to-end service that include at least one component service (or "micro-service") provided by a cloud service provider. In some cases, the end-to-end service may include multiple micro-services from multiple different cloud service providers each associated with a different third-party orchestration module 10404. The end-to-end service may also include one or more native services (such as any of the NFVs described herein) applied by the cloud exchange. Consolidation of service provisioning permits the cloud exchange provider to offer unified billing to customers, whereby the cloud exchange provider bills the customer for a cloud service provider-provided service according to cost information received from the cloud service provider and passes payment through to the cloud service provider. The cloud exchange provider also bills the customer for any native services, including layer 3 or other connectivity, NFVs, etc.

FIG. 6 illustrates service provisioning, described as follows. Service policy manager 10400 may receive a service request to configure a particular service. The request may specify one of third party services 10404, such as third party service 10404A. The request may require the use of one or more ports, thereby invoking port service 10402A. The request may further require an L3 service, thereby invoking L3 service 10402B. Service provisioning engine 10014 may perform a set of operations 10406-10410 to configure the requested service.

Service provisioning engine 10014 may perform one or more operations 10406 that procure service data for the requested service. To procure the service data, service provisioning engine 10014 may query and/or store data with business gateway 10412 and/or STAD 10016, as previously described in FIG. 5. Business gateway 10412 may include one or more APIs for interfacing with financial logic 10018, as illustrated in FIG. 5. For instance, service provisioning engine 10014 may send billing information for the requested service to business gateway 10412, which may send the information to financial logic 10018. Financial logic 10018 may associate the billing information for the service with a particular account. Service provisioning engine 10014 may also store information in STAD 10016 that identifies the service and one or more properties of the service. For instance, if the service includes a particular geographic location, particular service level request, etc., such details along with an identifier of the service may be stored in STAD 10016. After the service has been implemented and is being used, STAD 10016 metrics for the service may be updated and stored in STAD 10016.

Upon procuring the service data to implement the requested service, service provisioning engine 10014 may perform one or more operations 10408 to select one or more NFUs. Service provisioning engine 10014 may select the one or more NFUs based on the initial request or instructions received from service selector 10012. For instance, if the request specifies a particular geographic location, service provisioning engine 10014 may select an NFU for the particular geographical location. If the request specifies a particular quantity or type of resources, service provisioning engine 10014 may determine one or more NFUs that manage one or more cloud exchange points with sufficient resources to satisfy the particular quantity and/or type of resources requested. Service provisioning engine 10014 may query STAD 10016 to determine quantities and/or type of resources managed by different NFUs.

Once service provisioning engine 10014 has selected an NFU to provision the requested service, service provisioning engine 10014 may perform one or more operations to generate network provisioning data at 10410. For instance, service provisioning engine 10014 may translate a higher-level service request received from a customer into network provisioning data comprising a more specific set of instructions and/or requests that service provisioning engine 10014 sends to one or more NFUs. An NFU that receives the network provisioning data may configure network infrastructure based on the network provisioning data to provide the requested service.

FIG. 7 is a block diagram illustrating service assurance engine 10030 of FIG. 5 in further detail, in accordance with one or more techniques of the present disclosure. As described in FIG. 5, service assurance engine 10030 may receive information from network assurance engine 10028 and may compare the information with service level information, such as service level agreements, included in STAD 10016. By comparing information about the performance of infrastructure with service level information in STAD 10016, service assurance engine may send service level information to customers using one or more service assurance APIs, and whether such service level agreements or other performance thresholds are being met.

To determine whether such service level agreements or other performance thresholds are being met, service assurance engine 10030 may perform one or more operations 16000-10608. Service assurance engine 10030 may retrieve service data 1600. Service data may include definitions and/or descriptions of services that have been requested by customers and provisioned at one or more cloud exchange points. Based on the service data, service assurance engine 10030 may monitor the actual performance of cloud exchange points that provide the requested services. To determine the actual performance of cloud exchange points, service assurance engine 10030 may query or otherwise receive performance data 10602 from STAD 10030 that is populated by CNC system 10002 with data from one or more components, such as NFU 10004.

Service assurance engine 10030 may analyze the performance data in conjunction with the service data to identify anomalies, problems, or deficient performance associated with a service provisioned by a cloud exchange point 10604. For example, service assurance engine 10030 may determine that one or more conditions, criteria and/or thresholds are satisfied that indicate an anomaly, problem, or deficient performance 10604. If such conditions, criteria and/or thresholds are satisfied, service assurance engine 10030 may perform one or more remedial actions.

Service assurance engine 10030 may store one or more remedial actions 10606. In some examples, remedial actions may refer to one or more operations that may be taken by one or more components of CNC system 10002 to remedy an anomaly, problem, or deficient performance. A remedial action may be associated at service assurance engine 10030 with one or more conditions. For instance, when service assurance engine 10030 determines that one or more conditions, criteria and/or thresholds are satisfied, service assurance engine 10030 may determine remedial actions associated with the one or more conditions, criteria and/or thresholds. Examples of remedial actions may include re-allocating resources to continue providing a particular service at a cloud exchange point, and sending one or more notifications to one or more recipients, to name only a few examples. In some instances, an administrator and/or customer may configure the remedial actions and/or one or more conditions, criteria and/or thresholds prior to or at the time a service is provisioned at a cloud exchange point. In this way, if the one or more conditions, criteria and/or thresholds are satisfied with respect to a cloud exchange point, service assurance engine 10030 may determine the corresponding remedial actions.

As shown in FIG. 7, if the one or more conditions, criteria and/or thresholds are satisfied with respect to a cloud exchange point, service assurance engine 10030 may execute one or more remedial actions 10608. To execute the remedial actions, service assurance engine 10030 may communicate the remedial actions to service provisioning engine 10014, which carries out the operations defined by the remedial actions. In this way, service assurance engine 10030 may monitor and respond, in an automated manner, to an anomaly, problem, or deficient performance by performing one or more remedial actions.

Figure 8:
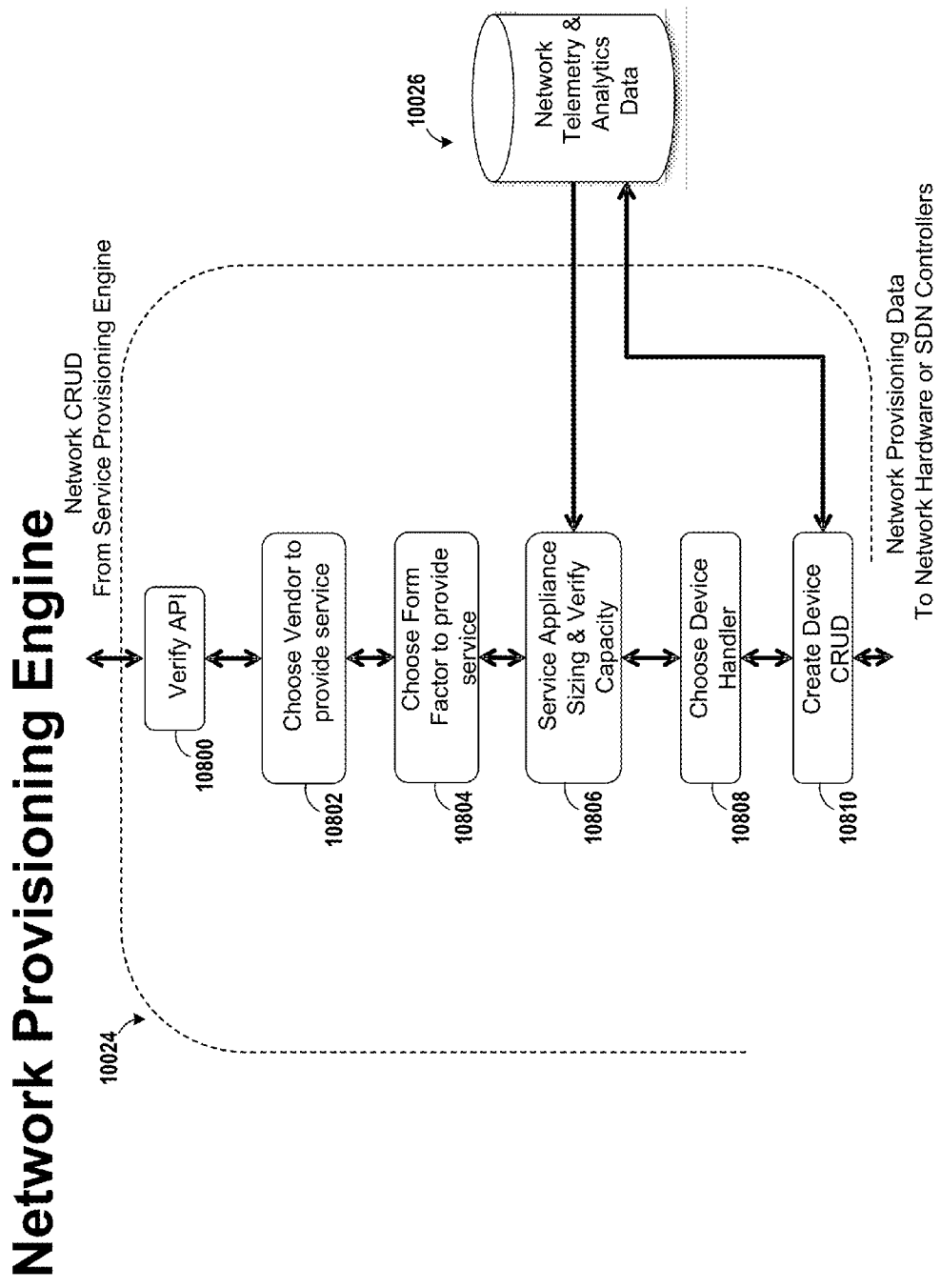
FIG. 8 is a block diagram illustrating an example network provisioning engine, in accordance with one or more techniques of the present disclosure.

FIG. 8 is a block diagram illustrating network provisioning engine 10024 of FIG. 5 in further detail, in accordance with one or more techniques of the present disclosure. Network provisioning engine 10024 of may receive network service definitions, instructions, and/or requests from service provisioning engine 10014 of CNC system 10002. Network provisioning engine 10024 uses the network service definitions, instructions, and/or requests to configure infrastructure managed by NFU 10004 in order to provision network services at one or more cloud exchange points. A "network service definition," as used herein, is data defining parameters for provisioning a network service at least partially instantiable by configuring a network of network devices that offer network services. Network services may include network services provided by (native service) or delivered by (cloud service or third-party service) the cloud exchange to a consumer of the aforementioned network service(s).

To further illustrate, in FIG. 8, upon receiving a network service definition, one or more instructions and/or requests, network provisioning engine 10024 may verify the contents and format of the a network service definition, instructions and/or requests 10800. For example, network provisioning engine 10024 may determine whether the network service definition, instructions and/or requests are valid. If the contents and/or format are invalid, network provisioning engine 10024 may send a response to service provisioning engine 10014 indicating the invalidity of the contents and/or format.

If the contents and format of the a network service definition, instructions and/or requests are valid, network provisioning engine 10802 may choose a vendor to provide the service based on the a network service definition, instructions and/or requests. For instance, CNC system 10002 may allow a customer or cloud service provider to select from a set of vendor equipment, one or more particular types of vendor equipment to provide a particular service. As an example, a cloud service provider may specify a particular vendor to provide a firewall service. The a network service definition, instructions and/or requests received by network provisioning engine 10024 from CNC system 10002 may specify a particular vendor to provide the service. Network provisioning engine 10024 may determine whether equipment for the particular vendor is available to provide the service. If not available, network provisioning engine 10024 may send a response to service provisioning engine 10014 indicating the unavailability of the vendor equipment.

If equipment for the particular vendor is available, network provisioning engine 10024 may choose a particular form factor for the vendor equipment 10804. In some examples, the form factor may be specified based on the a network service definition, instructions and/or requests received by network provisioning engine 10024 from service provisioning engine 10014. In other examples, network provisioning engine 10024 may automatically determine the form factor for the vendor equipment based on one or more parameters in the a network service definition, instructions and/or requests. For example, the one or more parameters may not specify the form factor; however, network provisioning engine 10024 may determine, based on the parameters, that a particular form factor of vendor equipment will satisfy the requirements of the a network service definition, instructions and/or requests. For instance, the parameters may specify a particular type of functionality and/or resource requirement that network provisioning engine 10024 may use to determine which form factor of vendor equipment can satisfy the requirements.

Network provisioning engine 10024 may determine sizing for the vendor equipment and/or verify capacity of the vendor equipment 10806. In some examples, network provisioning engine 10024 may query NTAD 10026 to determine current resource allocation and usage for infrastructure of a cloud exchange point that is managed by network provisioning engine 10024. The infrastructure may include the vendor equipment identified by network provisioning engine 10024 for the a network service definition, instructions and/or requests received from service provisioning engine 10014. Based on the requirements of the instructions and/or requests received from CNC 10002 and the current resource allocation and usage from NTAD 10026, network provisioning engine 10024 may determine whether adequate resources exist at the vendor equipment determined by network provisioning engine 10024 to provision the requested service. If sizing and/or capacity for the vendor equipment is insufficient for the instructions and/or requests received from service provisioning engine 10014, network provisioning engine 10024 may send a response to service provisioning engine 10014 indicating the insufficient sizing and/or capacity for the vendor equipment.

If sizing and/or capacity for the vendor equipment is sufficient for the a network service definition, instructions and/or requests received from service provisioning engine 10014, network provisioning engine 10024 may obtain a device handler to the specific vendor equipment 10808. In some examples, a device handler may be an identifier that uniquely identifies a particular device. Such devices may include the vendor equipment included in the infrastructure of one or more cloud exchange points. Upon choosing the device handler, network provisioning engine 10024 may configure or otherwise send one or more requests and/or instructions to SDN controller 10006 and/or hardware configurators 10008 to configure the device identified by the device handler 10810. In some examples, the requests may specify create, read, update, or delete operations to perform with respect to the device identified by the device handler.

FIG. 9 is a block diagram illustrating network assurance engine 10028 of FIG. 5 in further detail, in accordance with one or more techniques of the present disclosure. As described in FIG. 5, network assurance engine 10028 may send information to service assurance engine 10030, which may compare the information with service level information, such as service level agreements, included in STAD 10016. Network assurance engine 10030 may query NTAD 10026 in a similarly manner that service assurance engine 10030 queries STAD 10016. By comparing information about the performance of infrastructure with service level information in NTAD 10026, network assurance engine may send network level information to customers using one or more network assurance APIs, and whether service level agreements or other performance thresholds are being met.

To determine whether such service level agreements or other performance thresholds are being met, network assurance engine 10028 may perform one or more operations 11000-110010. Network assurance engine 10028 may retrieve network data 11000. Network data may include actual bandwidth, dropped packets, latency, uptime, to name only a few examples. Based on the network data, network assurance engine 10028 may monitor the actual performance of cloud exchange points that provide the requested services. To determine the actual performance of cloud exchange points, network assurance engine 10028 may query or otherwise receive performance data 11002 from NTAD 10026 that is populated by NFU 10004.

Network assurance engine 10028 may analyze the performance data in conjunction with the service data to identify anomalies, problems, or deficient performance associated with network infrastructure of a cloud exchange point 11004. For example, network assurance engine 10028 may determine that one or more conditions, criteria and/or thresholds are satisfied that indicate an anomaly, problem, or deficient performance 11004. If such conditions, criteria and/or thresholds are satisfied, network assurance engine 11004 may perform one or more remedial actions.

Network assurance engine 10028 may store one or more remedial actions 11006. In some examples, remedial actions may refer to one or more operations that may be taken by one or more components of CNC system 10002 to remedy an anomaly, problem, or deficient performance. A remedial action may be associated at network assurance engine 10028 with one or more conditions. For instance, when network assurance engine 10028 determines that one or more conditions, criteria and/or thresholds are satisfied, network assurance engine 10028 may determine remedial actions associated with the one or more conditions, criteria and/or thresholds. Examples of remedial actions may indicate re-allocating resources to continue providing a particular service at a cloud exchange point and/or sending one or more notifications to one or more recipients, to name only a few examples. In some instances, an administrator and/or customer may configure the remedial actions and/or one or more conditions, criteria and/or thresholds prior to or at the time a service is provisioned at a cloud exchange point. In this way, if the one or more conditions, criteria and/or thresholds are satisfied with respect to a cloud exchange point, network assurance engine 10028 may determine the corresponding remedial actions.

As shown in FIG. 9, if the one or more conditions, criteria and/or thresholds are satisfied with respect to a cloud exchange point, network assurance engine 10028 may execute one or more remedial actions 11008. To execute the remedial actions, network assurance engine 10028 may communicate the remedial actions to network provisioning engine 10024, which carries out the operations defined by the remedial actions. In this way, network assurance engine 10028 may monitor and respond, in an automated manner, to an anomaly, problem, or deficient performance by performing one or more remedial actions.

Figure 10:
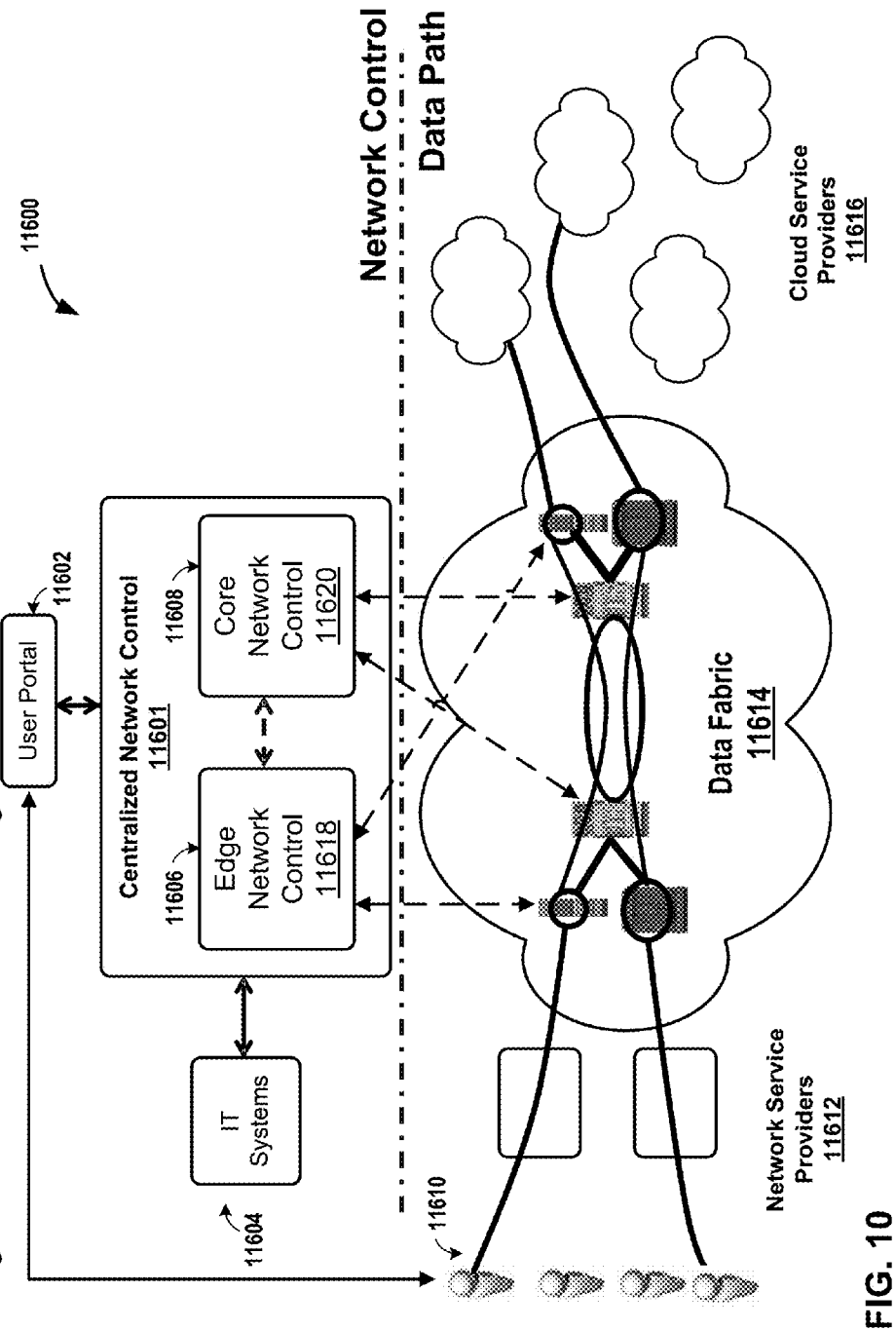
FIG. 10 is a block diagram illustrating a programmable network platform, in accordance with one or more techniques of the present disclosure.

FIG. 10 is a block diagram illustrating a programmable network platform 11600, in accordance with one or more techniques of the present disclosure. Programmable network platform 11600 may represent an example instance of programmable network platform 120, programmable network platform 10000, or other programmable network platform described in this disclosure. As shown in FIG. 10, programmable network platform 11600 may include a centralized network control (CNC) system 11601 that controls data fabric 11614. Data fabric 11614 may be configured by CNC system 11601 to provide one or more services, including virtual connections, which allow customers 11610 to use services provided by cloud service providers 11616.

Customers 11610 may desire to directly cross-connect to cloud service providers 11616 at a common point, such as data fabric 11614, thereby allowing direct exchange of network traffic between the networks of the customers and cloud service providers. In some examples, one or more services may be applied by data fabric 11614 to network traffic forwarded between customers 11610 and cloud service providers 11616. For instance, a customer may configure an L3 connection service with a firewall between the customer and a cloud service provider using data fabric 11614.

Figure 16:
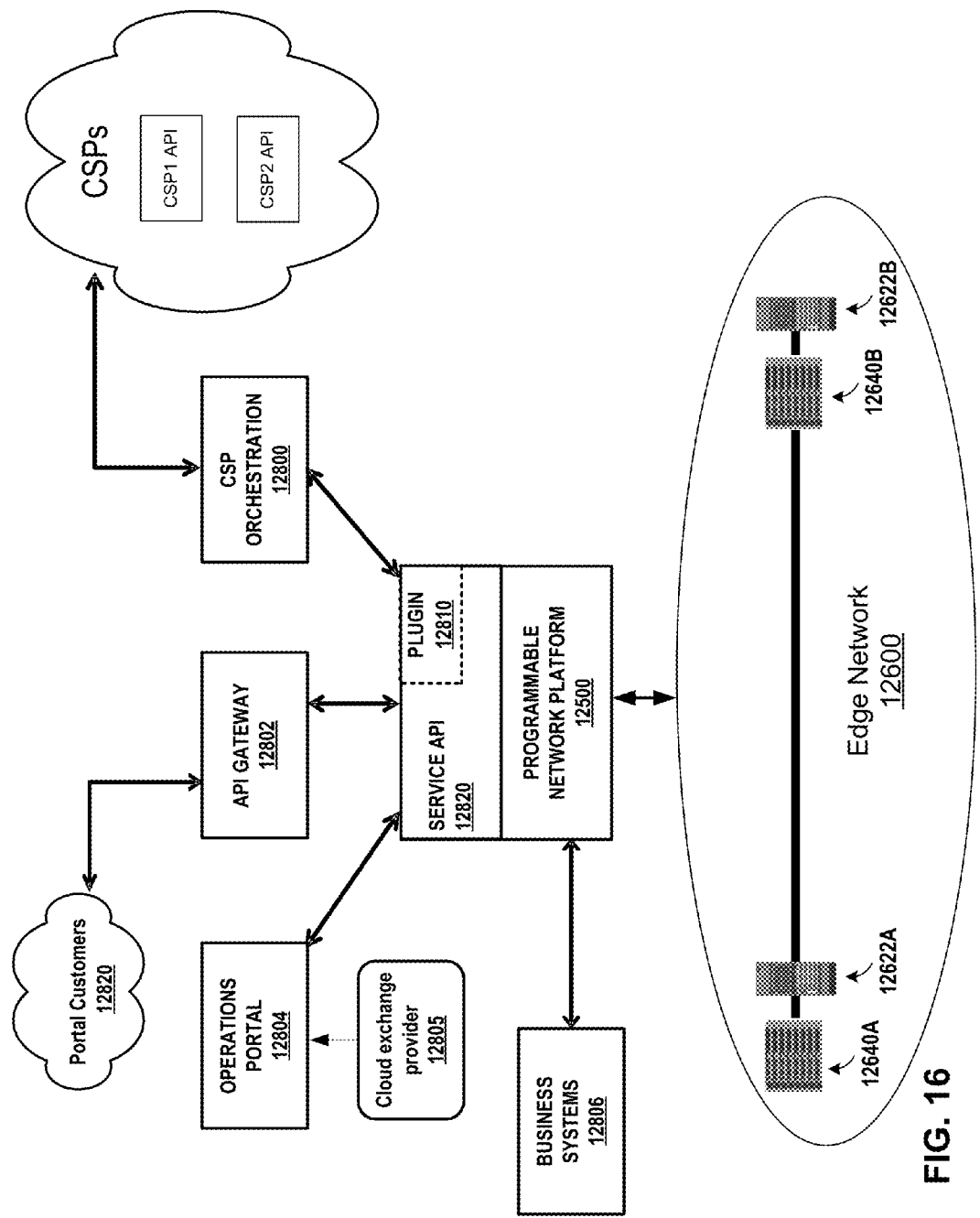
FIG. 16 is a block diagram illustrating a programmable network platform that includes interfaces by which external applications may configure a cloud exchange to facilitate delivery of cloud services from cloud service providers according to techniques described in this disclosure.

As further illustrated in FIG. 16, infrastructure that implements data fabric 11614 may be logically divided as edge and core network infrastructure. Edge network infrastructure may include network devices that couple the core network of data fabric 11614 to customer and cloud service provider networks. Core network infrastructure may include network devices that forward network traffic through the core network of data fabric 11614. In the example of FIG. 10, CNC system 11601 includes edge network control module 11618 that configures and provisions services at network devices included in the edge network infrastructure of data fabric 11614. CNC system 16601 also includes core network control module 11620 that configures and provisions services at network devices included in the core network infrastructure of data fabric 11614. Although shown in CNC system 11601, functionality of edge and/or core network control modules 11618, 11620 may be included in one or more NFUs and/or distributed between NFUs and CNC system 11601.

Figure 11:
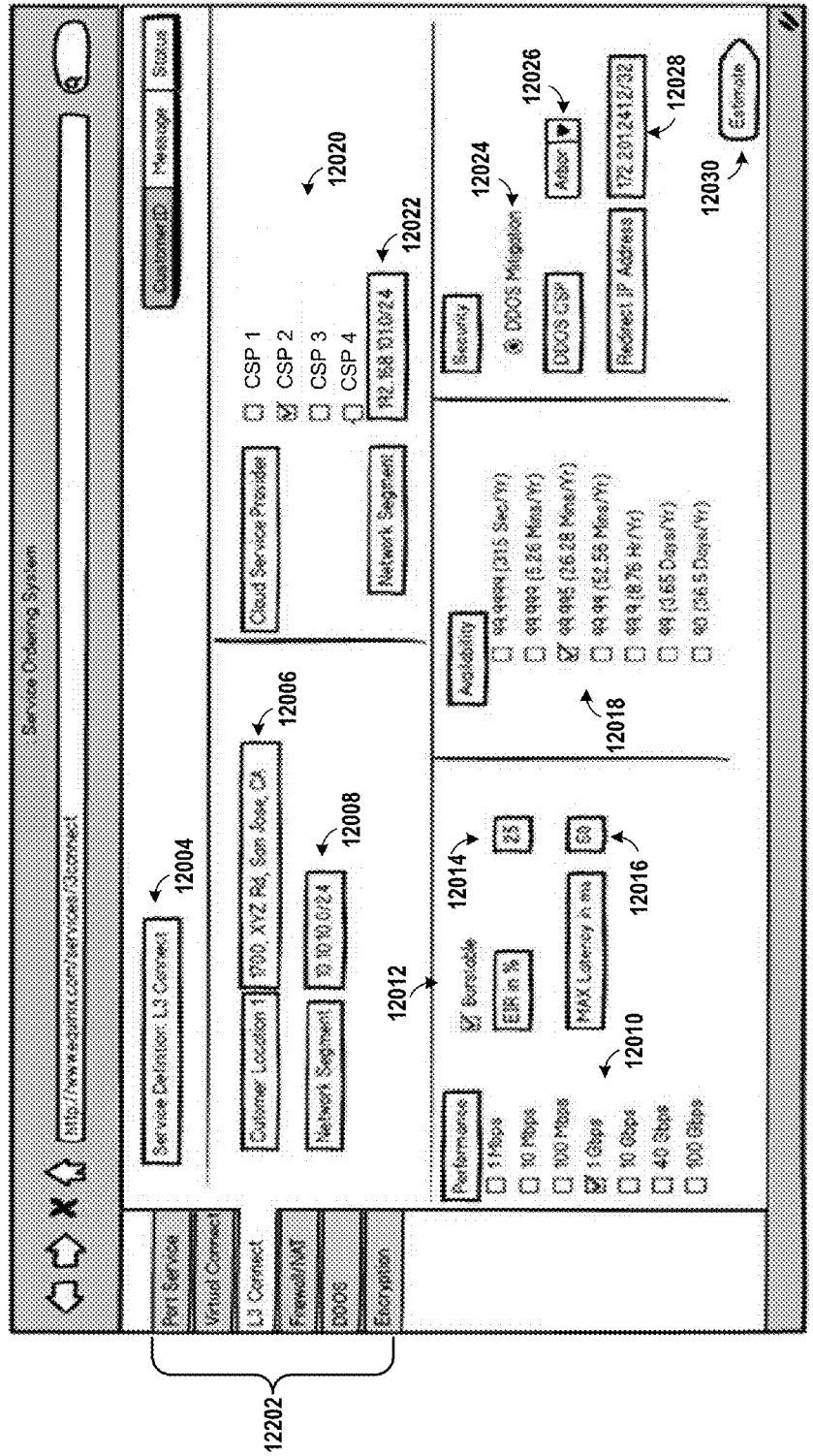
FIG. 11 is a block diagram illustrating an example user interface to request a service, in accordance with one or more techniques of the present disclosure.
Figure 12:
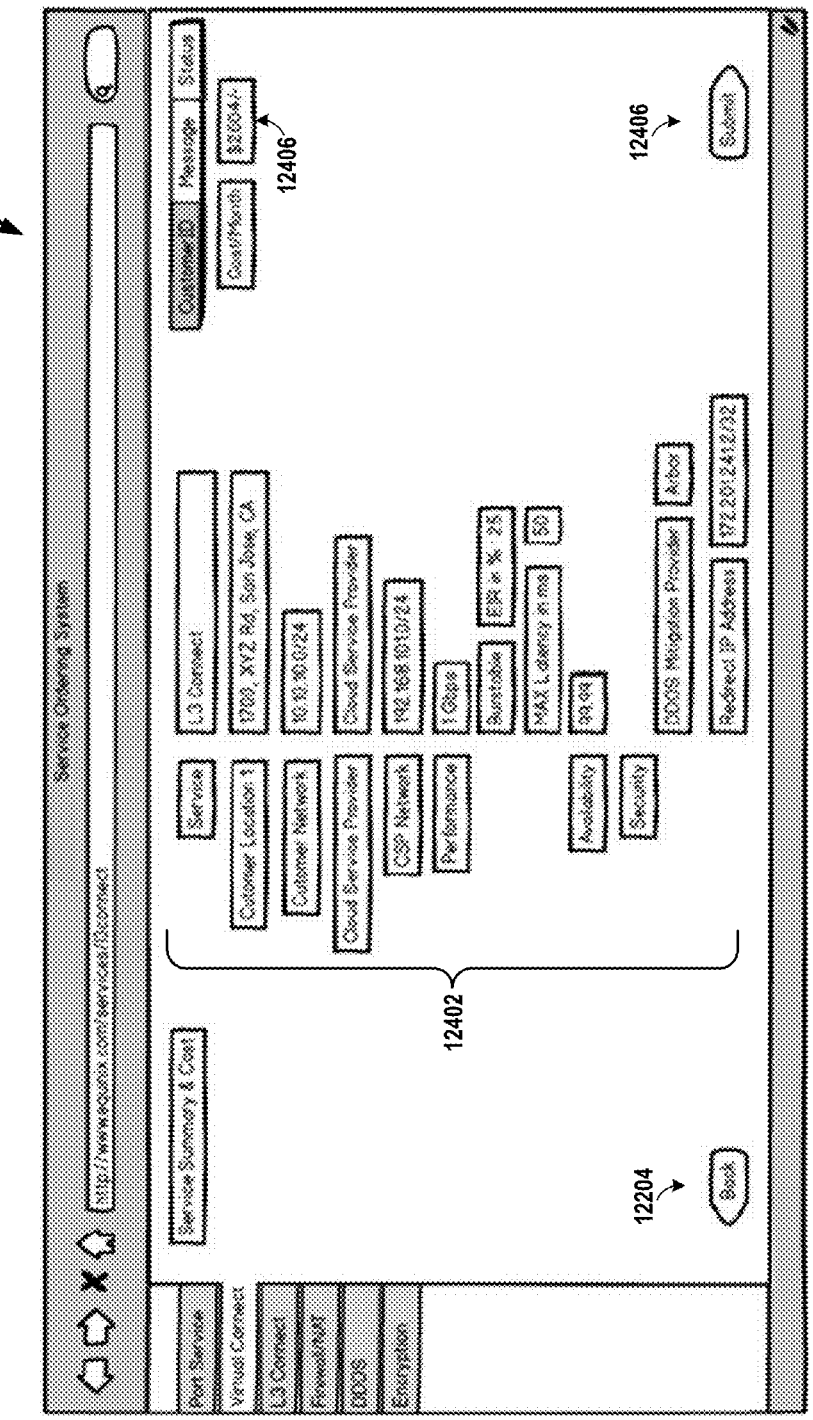
FIG. 12 is a block diagram illustrating an example user interface to display a cost estimate for a service, in accordance with one or more techniques of the present disclosure.

In one example, a customer of customers 11610 may desire to access one or more services provided by cloud service providers 11616. As an example, the customer may desire to access an office productivity service of cloud service providers 11616. Accordingly, the customer may submit a request using user portal 11602 for an L3 connection and firewall provided at data fabric 11614 that allows for the direct exchange of network traffic between the customer and the cloud service provider of the office productivity service. Example user interfaces provided by user portal 11602 are illustrated in FIGS. 11 and 12.

CNC system 11601 receives the request for the L3 connection service. Edge network control module 11618 and core network control module 11620 may each configure edge network infrastructure and core network infrastructure, respectively, for the L3 connection service. In some examples, edge and core network control modules 11618, 11620 may identify one or more NFUs that will configure network infrastructure to provide the L3 connection service. For instance, edge network control 11618 may identify a first set of one or more NFUs to configure edge network infrastructure, while core network control module 11620 may identify a second set of one or more NFUs to configure core network infrastructure.

In some examples, network control 11618 may directly configure edge network infrastructure that couples the customer network to the core network of data fabric 11614 and the cloud service provider 11616 to the core network of data fabric 11614. In other examples, edge network control module 11618 may send instructions and/or requests for the L3 connection service and firewall service to one or more NFUs that configure the edge network infrastructure that couples the customer network to the core network of data fabric 11614 and the cloud service provider 11616 to the core network of data fabric 11614. Similarly, core network control module 11620 may send instructions and/or requests for the L3 connection service and firewall to one or more NFUs that configure the core network infrastructure of data fabric 11614 and the cloud service provider 11616 to the core network of data fabric 11614. Upon configuration of edge and core network infrastructure to provide the L3 connection service and firewall, the customer of customers 11610 that requested the L3 connection service may directly connect, via a network service provider and data fabric 11614, to the office productivity service.

In some examples, one or more IT systems 11604 may be coupled to CNC system 11601. IT systems 11604 may include one or more computing devices, such as desktop computers, tablets, smartphones, and servers, to name only a few examples. IT systems 11604 may provide one or more user interfaces to administrators, which may use IT systems 11604 to administrate 11601. IT systems 11604 may, for example, receive user inputs to configure CNC system 11601. Based on the user inputs, IT systems 11604 may send requests and/or instructions to CNC system 11601. In some examples, CNC system 11601 may provide or otherwise expose one or more RESTful interfaces that can be invoked by IT systems 11604.

FIG. 11 is a block diagram illustrating an example user interface 12200 to request a service, in accordance with one or more techniques of the present disclosure. In some examples, a centralized network control system, such as CNC system 10002 or CNC system 11601, or a portal to such as system, may generate user interface 12200 for display. In some examples, user interface 12200 may be implemented as one or more HTML documents that may be rendered in a web browser. User interface 12200 may be implemented in a standalone application that is executable on a mobile computing device, desktop computing device, or laptop device to name only a few examples, and that invokes a programmable network platform in a manner described herein. For example purposes, user interface 12200 is illustrated in a web browser in FIG. 11.

As shown in FIG. 11, user interface 12200 may allow a user to configure an L3 connection service. User interface 12200 may include a side menu 12202, which lists each different type of service that may be configured by a user. Side menu 12202 may include one or more elements, where each respective element corresponds to a particular type of service. An element may be selected by a user, which displays a corresponding user interface to configure the type of service associated with the element. For instance, as shown in FIG. 11, an element that corresponds to configuring a L3 connection service has been selected by the user. Accordingly, user interface 12200 includes user interface elements to configure a L3 connection service.

In some examples, user interface 12200 includes a user interface element 12004, such as a label, that displays the type of service definition being configured by the user. In the example of FIG. 11, user interface element 12004 includes "L3 Connect" as the type of service definition that is being configured by the user, which may correspond to a L3 connection service. As used herein, the term "service definition" refers to data defining parameters for provisioning a business level service, within a cloud exchange, for one or more network services provided by (native service) or delivered by (cloud service or third-party service) the cloud exchange to a consumer of the aforementioned service(s). A service definition may define multiple services within an overall service, including for each service one or more service requirements to implement the service. Implementing a service may include both service orchestration and network provisioning, for instance. Native services may include, e.g., a port service, L3 connectivity service, L2 service, L3+ service, firewall, NAT, DPI, and other native services applied within the cloud exchange to cloud service traffic from a cloud service provider network to modify, inspect, shape (e.g., filter or apply QoS), and/or deliver the cloud service traffic. Cloud services may include Software-as-a-Service (SaaS), Platform-aaS (PaaS), InfrastructureaaS (IaaS), Virtualization-aaS (VaaS), and data Storage-aaS (dSaaS) services, such as content/media delivery, cloud-based storage, cloud computing, online gaming, IT services, etc. The service definition may specify cloud exchange endpoints and other connectivity information for connecting to a cloud service, policies, SLA, and/or QoS for a service, an originator, an owner, a service identifier, a destination, for example. Additional examples of service definitions are described below. Certain parameters of the service definition, such as bandwidth, policies, SLA, and QoS for the service to be applied within the cloud exchange, may be alternatively referred to as "service requirements" in that the requestor requires that the service be applied/delivered in such as manner as to meet such requirements.

In some examples, user interface 12200 may include a user interface element 12006 that enables a user to select or otherwise specify a geographic location. The geographic location may be a location of a customer site and/or a location of a cloud exchange point. For instance, in FIG. 11 the user may use user interface element 12006 to provide a geographic location in San Jose, Calif. To name only a few examples, user interface element 12006 may be implemented as a drop-down menu that is pre-populated with available locations or may be implemented as a text input field in which the user may enter a location.

User interface 12200 may include a user interface element 12008 that enables a user to select or otherwise specify a network segment for the L3 connection service for the customer. In some examples, the network segment is defined by a range of layer 3 addresses, such as Internet Protocol (IP) addresses 12008. For instance, in FIG. 11 the user may use user interface element 12008 to provide an IP address range of 10.10.10.0/24. To name only a few examples, user interface element 12008 may be implemented as a drop-down menu that is pre-populated with available network segment values or may be implemented as a text input field in which the user may enter a network segment value.

User interface 12200 may include one or more user interface elements 12010 that enable a user to select or otherwise specify minimum and/or maximum performance requirements for the L3 connection service. For instance, a variety of bandwidths may be associated with the one or more user interface elements 12010 from which the user may select a minimum and/or maximum performance requirement for the service. In the example of FIG. 11, example performance requirements, selectable by the user, include 1 Mbps, 10 Mbps, 100 Mbps, 1 Gbps, 10 Gbps, 40 Gbps, and 100 Gbps. To name only a few examples, user interface element 12010 may be implemented as a drop-down menu that is pre-populated with available bandwidths, a set of radio buttons or checklists where each selectable element has a corresponding bandwidth, or may be implemented as a text input field in which the user may enter a bandwidth.

User interface 12200 may include one or more user interface elements 12012, 12014, and 12016 that enable a user to, respectively, specify whether the bandwidth is burstable, specify an Excess Information Rate (EIR), and/or specify a maximum latency. As shown in FIG. 11, user interface element 12012 may be implemented as a checkbox, user interface element 12012 may be implemented as a text input field, and user interface element 12016 may be implemented as a text input field, although other types of user interface elements may be also be used.

User interface 12200 may include one or more user interface elements 12018 that enable a user to select or otherwise specify an uptime or availability requirement for the L3 connection service. For instance, a variety of availability levels may be associated with the one or more user interface elements 12018 from which the user may select an uptime or availability requirement for the service. In the example of FIG. 11, example uptime or availability requirements, selectable by the user, include 99.9999%, 99.999%, 99.995%, 99.99%, 99%, and 90% uptime. To name only a few examples, user interface element 12018 may be implemented as a drop-down menu that is pre-populated with uptime or availability values, a set of radio buttons or checklists where each selectable element has a corresponding uptime or availability, or may be implemented as a text input field in which the user may enter an uptime or availability.

User interface 12200 may include one or more user interface elements 12020 that enable a user to select or otherwise specify a cloud service provider for the L3 connection service. For instance, the customer may select one or more cloud service providers that provide services which the customer may consume using the L3 connection service. To name only a few examples, user interface elements 12020 may be implemented as a drop-down menu that is pre-populated with cloud service providers, a set of radio buttons or checklists where each selectable element has a corresponding cloud service provider, or may be implemented as a text input field in which the user may enter a cloud service provider. User interface 12200 may include a user interface element 12022 that enables a user to select or otherwise specify a network segment for the L3 connection service for the cloud service provider. In some examples, the network segment is defined by a range of layer 3 addresses, such as Internet Protocol (IP) addresses 12022.

User interface 12200 may include one or more user interface elements 12024, 12026, and 12028 that enable a user to, respectively, select Distributed Denial-of-Service protection for the service, the Distributed Denial-of-Service protection provider, and/or a redirect IP address. As shown in FIG. 11, user interface element 12024 may be implemented as a radio button or checkbox, user interface element 12026 may be implemented as a dropdown list, and user interface element 12028 may be implemented as a text input field, although other types of user interface elements may be also be used.

User interface 12200 may include a user interface element 12030 to submit the selected and/or inputted values of user interface 12200 for further processing. User interface element 12030 is implemented as a button in FIG. 11. When user interface element 12030 is selected, the selected and/or inputted values of user interface 12200 may be validated and may be further processed to implement the service and/or provide an estimate of cost to implement the service to the user before actually implementing the service.

FIG. 12 is a block diagram illustrating an example user interface 12400 to display a cost estimate for a service, in accordance with one or more techniques of the present disclosure. In some examples, a centralized network control system, such as CNC system 10002 or CNC system 11601, or a portal to such as system, may generate user interface 12400 for display. In some examples, user interface 12400 may be implemented as one or more HTML documents that may be rendered in a web browser. User interface 12400 may be implemented in a standalone application that is executable on a mobile computing device, desktop computing device, or laptop device to name only a few examples, and that invokes a programmable network platform in a manner described herein. For example purposes, user interface 12400 is illustrated in a web browser in FIG. 12.

As shown in FIG. 12, user interface 12400 may provide cost information for a service based on user input provided for user interface 12200 in FIG. 11. In some examples, user interface 12400 may include one or more user interface elements 12402 that include the input values provided by the user in user interface 12200 of FIG. 11. Accordingly, a user may review the input values to determine that the value are correct. If the user desires to change one or more values, the user may select user interface element 12204, which causes user interface 12200 to again be displayed with the input values, thereby allowing the user to update or otherwise change such input values. In other examples, user interface element 12204 may include user interface elements that allow the user to update or otherwise make changes to input values in user interface 12204 without returning to user interface 12200.

User interface 12400 may include one or more user interface elements that included one or more costs for the requested service. For instance, user interface 12400 may include user interface element 12406, which displays a cost-per-month of the requested service. By outputting the cost-per-month for the requested service, the user may evaluate the cost of the service. In some examples, other cost values may be included in user interface 12400. For instance, user interface 12400 may include itemized costs corresponding to one or more input values of user interface elements 12402. In some examples, alternative itemized costs for alternative input values may also be included in user interface 12400. For instance, the alternative cost for 99.999% uptime may be included in user interface 12400. The user, upon reviewing the cost information, may select user interface element 12406 (e.g., a button) to submit the request for the service. Upon selecting the user interface element, CNC system 10002 may configure one or more cloud exchange points to provision the service requested by the user based on the input values shown in user interface 12400.

Figure 13:
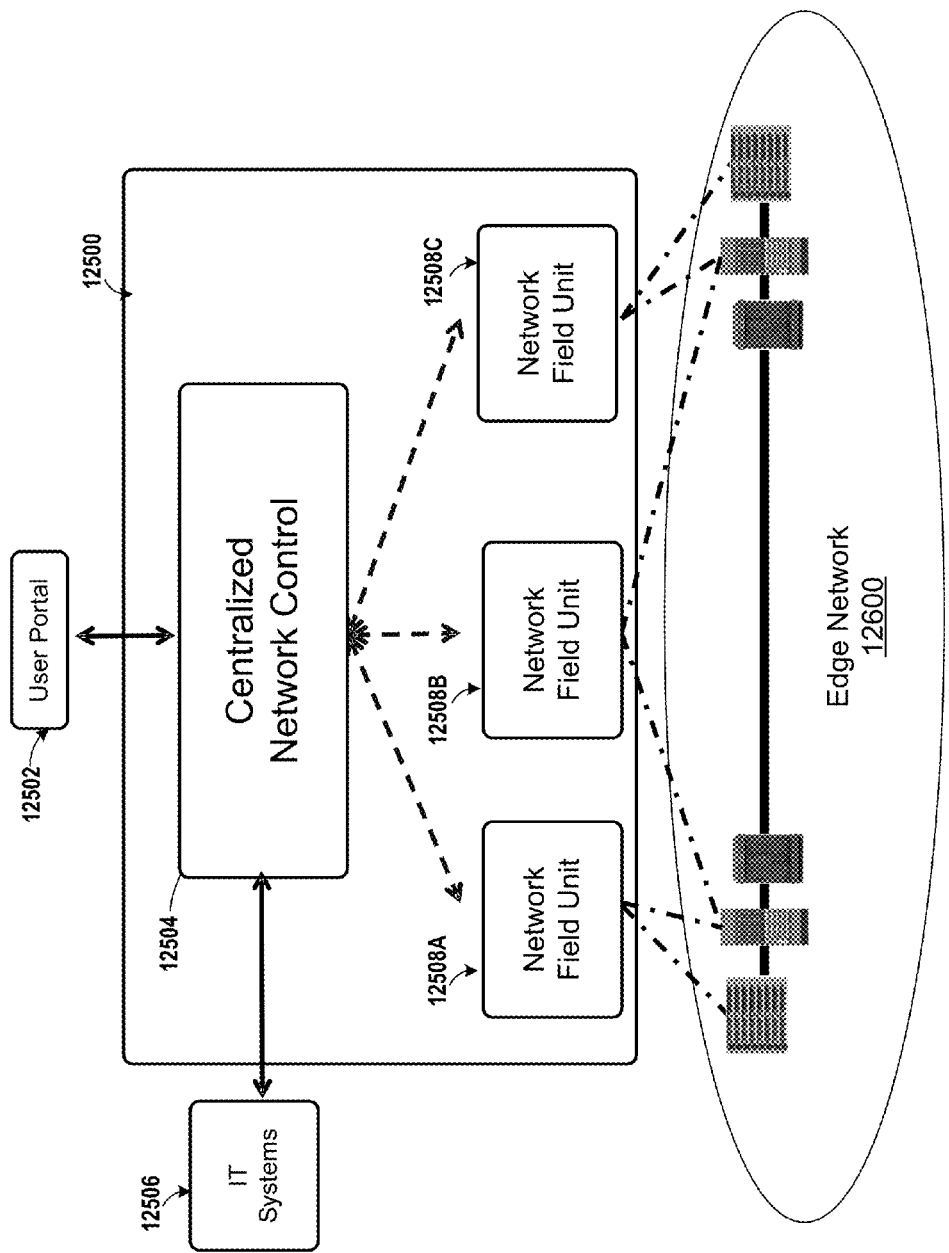
FIG. 13 is a conceptual diagram illustrating example components for a programmable network platform operating according to techniques described in this disclosure.

FIG. 13 is a conceptual diagram illustrating example components for a programmable network platform operating according to techniques described in this disclosure. In this example, programmable network platform 12500 includes a centralized network control component 12504 ("CNC 12504") that interfaces with a plurality of decentralized network field units 12508A-12508C ("NFUs 12508") to provision devices of edge network 12600 and assure the delivery of layer 3 cloud services to customers. Each of the NFUs 12508 may provision a different subset of devices, or "portion of," edge network 12600. For example, edge network 12600 may include devices distributed among numerous cloud exchange points or metro-based cloud exchanges, each cloud exchange point or metro-based cloud exchange being provisioned for services by a different NFU 12508.

Programmable network platform 12500 may represent, e.g., an example instance of programmable network platform 120. CNC 12504 may represent an example instance of CNC 1002 or CNC 11601. NFUs 12508 may each represent an example instance of NFU 1004. User portal 12502 represents client-side software for interfacing with the programmable network platform 12500 and may represent a customer portal, customer applications, a cloud exchange provider application, a console such as a command-line interface or graphical user interface, and/or a cloud service provider-developed application. Users/clients may include customers, the cloud exchange provider, and cloud service providers.

In some aspects, a controller, such as the programmable network platform described herein, may provision the cloud exchange with services made up of multiple constituent services provided by different cloud service providers. Each of these constituent services is referred to herein as a "micro-service" in that it is part of an overall service applied to service traffic. That is, a plurality of micro-services may be applied to service traffic in a particular "arrangement," "ordering," or "topology," in order to make up an overall service for the service traffic. Micro-services may be applied by cloud service providers or within the cloud exchange.

The programmable network platform may in this way orchestrate a business-level service across heterogeneous service providers. The programmable network platform exposes interfaces by which a portal, console (e.g., user interface application), or other application may define the service policy, quality, service level agreements (SLAs), and cost as a coordinated service topology made up of micro-services provided by different cloud service providers (or "cloud vendors"). Each micro-service may have a corresponding service policy, quality, SLA, and cost, as part of the overall, end-to-end business service definition, as described in further detail below. When provided with a service definition for an end-to-end service having multiple component micro-services, the programmable network platform may orchestrate each of the micro-services within the cloud exchange and stitch the micro-services together according to the defined topology in order to reify the end-to-end service within the cloud exchange (or edge network that includes the cloud exchange). As a result, the cloud exchange interconnects, in the data plane, micro-services provided by respective cloud services providers on behalf of and for the benefit of a customer of the cloud exchange or of at least one of the cloud service providers.

Figure 14A:
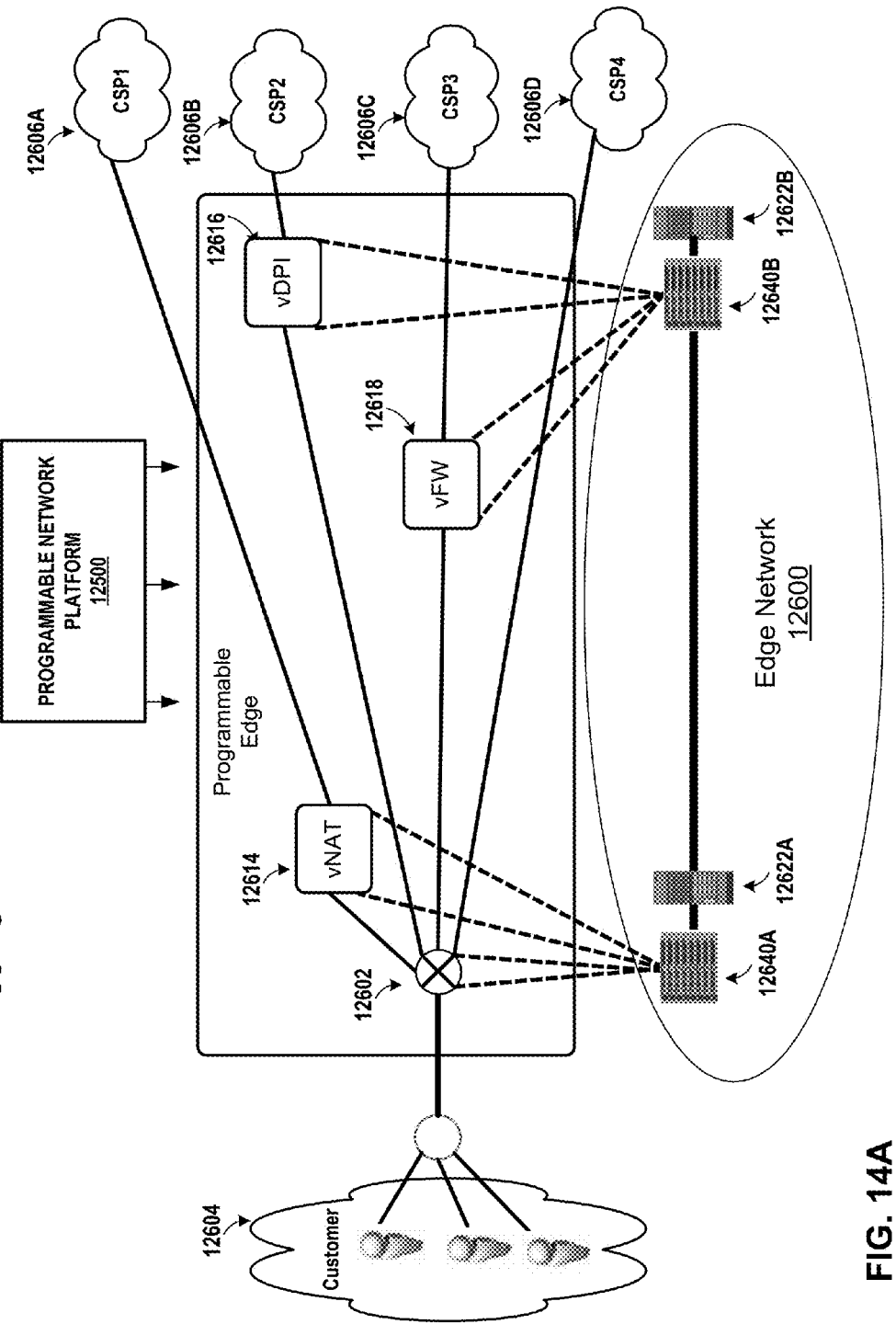
FIG. 14A is a block diagram that illustrates an example configuration of a programmable edge network that has been configured to apply multiple native services to cloud service traffic aggregated by a cloud exchange from multiple cloud service providers for delivery to a customer.

FIG. 14A is a block diagram that illustrates an example configuration of a programmable edge network that has been configured to apply multiple native services to cloud service traffic aggregated by a cloud exchange from multiple cloud service providers for delivery to a customer. Edge network 12600 may include any of the data center-based cloud exchanges or cloud exchange points described herein, such as cloud exchange points 128 of FIG. 1, cloud exchange 200 of FIG. 2, and the cloud exchange point of FIG. 10 including data fabric 11614.

Edge network 12600 includes network infrastructure including layer 3 (L3) forwarding elements 12622A-12622B (collectively, "forwarding elements 12622"), which may include one or more routers, switches, and other L3 forwarding devices. Although not shown, edge network 12600 may also include, for example, one or more non-edge (core) switches, routers, hubs, gateways, security devices such as firewalls, intrusion detection, and/or intrusion prevention devices, computer terminals, laptops, printers, databases, wireless mobile devices such as cellular phones or personal digital assistants, wireless access points, bridges, cable modems, application accelerators, or other network devices.

Edge network 12600 further includes servers 12640A-12640B (collectively, "servers 12640") that offer one or more compute/computing farms by which the edge network 12600 may offer services to customer 12604 and/or apply services to service traffic for customer 12604. Servers 12640 may represent x86 or other real or general-purpose servers configured to apply and/or offer services to customers. Servers 12640 may also include special-purpose appliances or containers for applying services to service traffic between customers and cloud service providers 12606. Such services may include, e.g., NAT, DPI, FW, DDOS mitigation, and other native services that may be applied by the cloud exchange edge network 12600 controlled by the cloud exchange provider and as configured by programmable network platform 12500.

The cloud exchange provider that manages, administers, and configures edge network 12600 facilitates the application of such native services to service traffic exchanged between customer 12604 and any of cloud service providers 12606A-12606D ("CSPs 12606"), each of which may represent any of cloud service providers 110 for instance. Edge network 12600 is configured with virtual NAT (vNAT) service 12614 for application to service traffic sourced by or destined to CSP 12606A, virtual Deep Packet Inspection (vDPI) service 12616 for application to service traffic sourced by or destined to CSP 12606B, and virtual Firewall (vFW) service 12618 for application to service traffic sourced by or destined to CSP 12606C, all such service traffic sourced by or destined to customer 12604. Services 12614, 12616, and 12618 may represent Network Function Virtualization (NFV) services in that the services virtualize functions frequently offered by network service providers employing dedicated service appliances (e.g., NAT, DPI, and firewall devices, whether employed separately or by an integrated Unified Threat Management (UMT) device, e.g.). While this example illustrates and describes virtual services (or NFVs), the services may be applied by controllers, appliances, or containers administered by the cloud exchange provider.

PE router 12602 in this example represents a real or virtual PE router that aggregates service traffic from multiple cloud service providers 12606 for delivery to a single customer 12604. Programmable network platform 12500 configures the PE router 12602 to import and export L3 routes for the cloud service providers 12606 to enable aggregated layer 3 cloud service cloud service delivery, as described above with respect to FIGS. 1-4. In addition, programmable network platform 12500 allows customers, cloud service providers, and/or the cloud exchange provider to configure edge network 12600 with services 12614, 12616, and 12618 for assured delivery of cloud service traffic from respective cloud service providers 12606A-12606C.

In some aspects, a controller, such as the programmable network platform described herein, may provision a L3 cloud-based services exchange ("cloud exchange") to deliver services made up of multiple constituent services provided by different cloud service providers and in some cases by the cloud exchange itself. Each of these constituent services is referred to herein as a "micro-service" in that it is part of an overall service applied to service traffic. That is, a plurality of micro-services may be applied to service traffic in a particular "arrangement," "ordering," or "topology," in order to make up an overall service for the service traffic. The micro-services themselves may be applied or offered by the cloud service providers.

The programmable network platform may in this way orchestrate a business-level service across heterogeneous cloud service providers. The programmable network platform exposes application programming interfaces (APIs) by which a portal, console (e.g., user interface application), or other application may define the service policy, quality, service level agreements (SLAs), and cost as a coordinated service topology made up of micro-services provided by different cloud service providers (or "cloud vendors"). Each micro-service may have a corresponding service policy, quality, SLA, and cost, as part of the overall, end-to-end business service definition, as described in further detail below. When provided with a service definition for an end-to-end service having multiple component micro-services, the programmable network platform orchestrates each of the micro-services within the cloud exchange and stitches the micro-services together according to the defined topology in order to reify the end-to-end service within the cloud exchange data plane (e.g., an edge network for the cloud exchange). As a result, the cloud exchange interconnects, in the data plane, micro-services provided by respective cloud services providers on behalf of and for the benefit of a customer of the cloud exchange. In doing so, the cloud exchange provider may facilitate business transactions between the cloud service providers and customers.

Figure 14B:
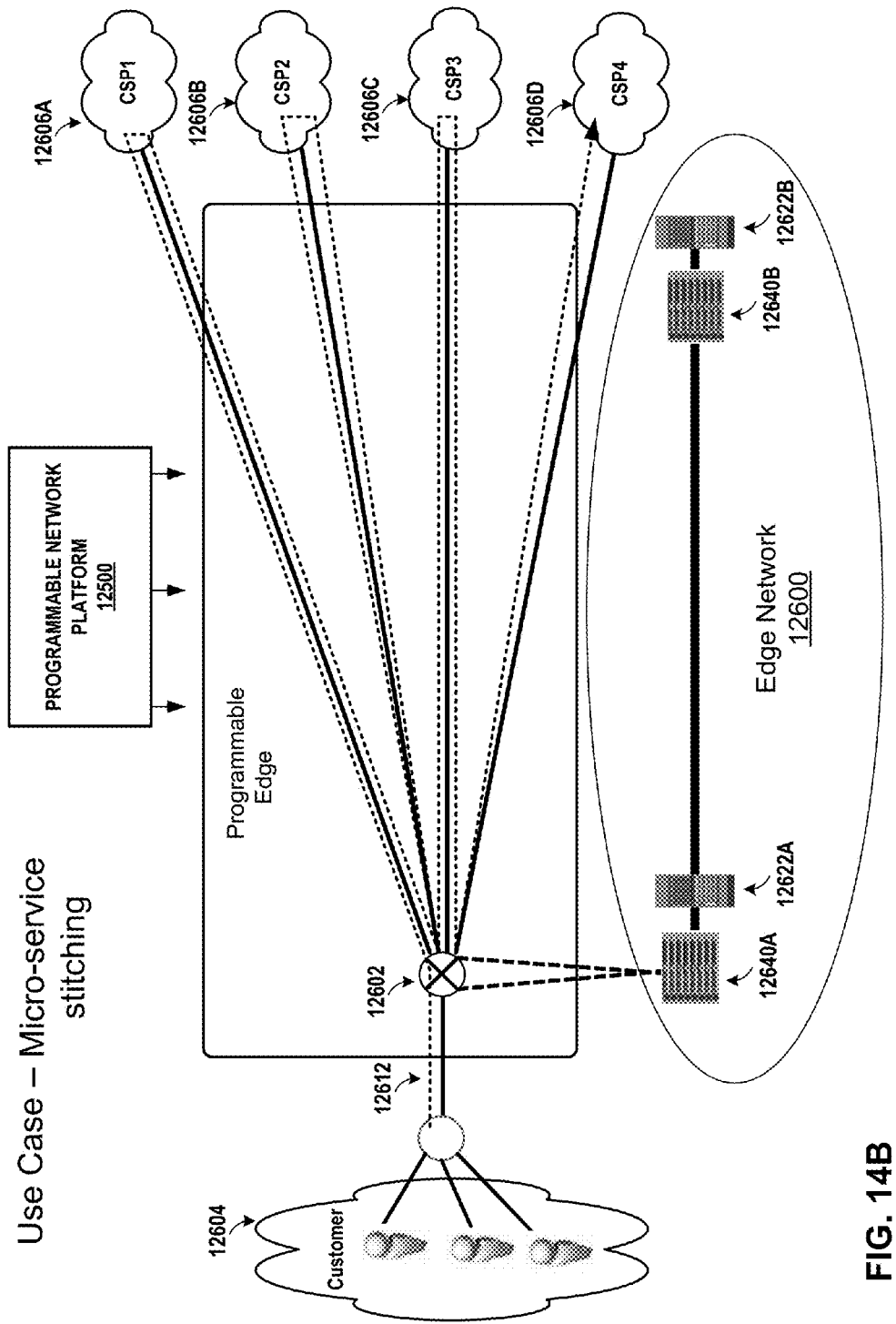
FIG. 14B is a block diagram that illustrates an example configuration of a programmable edge network that has been configured to offer an end-to-end service that is a sequence of multiple constituent micro-services applied by respective cloud service providers.

FIG. 14B is a block diagram that illustrates an example configuration of a programmable edge network that has been configured to offer an end-to-end service that is a sequence of multiple constituent micro-services applied by respective cloud service providers. Edge network 12600 may include any of the data center-based cloud exchanges or cloud exchange points described herein, such as cloud exchange points 128 of FIG. 1, cloud exchange 200 of FIG. 2, and the cloud exchange point of FIG. 10 including data fabric 11614.

Micro-services for an overall service established for a customer may include a mix of Software-as-a-Service (SaaS), Platform-aaS (PaaS), Infrastructure-aaS (IaaS), Virtualization-aaS (VaaS), and data Storage-aaS (dSaaS) services in any ordering. For example, different cloud service providers 12606 may execute applications that analyze application data of service traffic 12612 to generate reporting data, store application data, generate new application data for sending as additional service traffic 12612 along the sequence of micro-services, and so forth.

In accordance with techniques described herein, each of cloud service providers 12606 offers/executes a micro-service that edge network 12600 arranges (or "chains") together to form an overall multi-cloud service for customer 12604. More specifically, in some aspects, the programmable network platform 12500 configures a router (or forwarder) 12602 to stitch together the micro-services offered by respective various cloud service providers 12606 into an overall service to apply to packets of service traffic 12612.

The customer 12604 may use the programmable network platform 12500 to select and arrange the micro-services of cloud service providers 12606 for at least some of the service traffic originated or received by the customer 12604 network. As described above, the programmable network platform 12500 may offer the customer connectivity to multiple different cloud service providers. Upon selecting the cloud service providers offering micro-services and a topology for the micro-services, the programmable network platform 12500 configures the edge network 12600 to provision connectivity for the micro-services for the customer 12604. Selecting a cloud service provider may include entering connectivity parameters for the micro-service offered by the cloud service provider. Such connectivity parameters may include L3 routes and bandwidth or other QoS requirements.

In the illustrated example, router 12602 receives L3 routes for each of the cloud service provider 12606 networks that enable the router 12602 to forward service traffic 12612 along the overall end-to-end service path. To implement the router 12602, the programmable network platform 12500 may, for instance, configure one or more servers 12620A to execute a virtual router (or configure a dedicated router) that includes VRFs for each of the cloud service provider 12606 networks. As described above with respect to FIG. 4, for instance, the VRFs may be associated with route targets to establish a hub-and-spoke topology for sending and receiving service traffic 12612, with router 12602, to and from the cloud service provider 12606 networks that offer the micro-services.

Consequently, the cloud exchange provider that administers edge network 12600, using via the programmable network platform 12500, may alleviate customer 12604 from establishing, administering, and at least in some instances assuring the end-to-end service that is made up of micro-services of cloud service providers 12606. Customer 12604, for instance, can forward service traffic 12612 to edge network 12600 in accordance with cloud exchange provider routes and need not peer with cloud service provider 12606 networks in order to obtain routes for each of those networks. Rather, the cloud exchange point of edge network 12600 internalizes the L3 routing protocol peering arrangements with the cloud service provider 12606 networks and imports the L3 routes to cloud service provider 12606 networks in order to forward service traffic along the topology of the overall service.

Router 12602 may include VRFs configured by the programmable network platform to import and export respective L3 routes for the services provided by cloud service providers 12606. The router 12602 may receive the routes from the programmable network platform in some instances, or receive the routes via peering sessions with the provider edge (PE) routers of edge network 12600 that connect the cloud exchange to any of the cloud service provider 12606 networks.

The edge network 12600 may advertise, to customer 12604, L3 routes of the cloud exchange point autonomous system NATed with L3 routes of the cloud service provider 12606D network by the cloud exchange, L3 routes for the vNAT service 12614, (in this example that includes a NAT service), or L3 routes of the cloud service provider 12606D network. In this way, the edge network 12600 may aggregate the delivery of multiple, multi-cloud L3 services to customer 12604.

FIG. 14B illustrates the delivery, by edge network 12600, of an end-to-end service made up of multiple micro-services to service traffic 12612. The customer 12604 network sends service traffic 12612 to edge network 12600 and destined for a network address within a prefix advertised as an L3 route by the edge network 12600 to the customer 12604 network. Service traffic 12612 may include one or more packet flows, each packet flow associated with one or more packets that include application-layer data generated and/or consumed by an application executing within the customer 12604 network. Although illustrated in FIG. 14B as originating from the customer 12604 network and proceeding upstream toward the cloud service providers, the techniques are similarly applicable to downstream service traffic destined for the customer 12604 network, as well as to downstream service traffic originated from one of the cloud service providers 12606 networks and destined for one of the cloud service provider 12606 networks. For example, a cloud service provider 12606D may inject application data via router 12602 to an application executed by the cloud service provider 12606C network to analyze the application data, which sends the analyzed application data for processing to the cloud service provider 12606B network, which in turns send the application data for storage to a dSaaS-providing cloud service provider 12606A network.

In the illustrated example, however, router 12602 receives service traffic 12612, determines the first micro-service for service traffic 12612, and directs the service traffic 12612 to the cloud service provider 12606A network. The cloud service provider 12606A network applies its micro-service returns the service traffic 12612 (which may be modified from the service traffic originated by the customer 12604 in accordance with the micro-service applied by cloud service provider 12606A) to router 12602.

Router 12602 determines the next micro-service for service traffic 12612 and forwards the service traffic 12612 to cloud service provider 12606B. The cloud service provider 12606B network applies its micro-service and returns the service traffic 12612 (which may be modified in accordance with the micro-service applied by cloud service provider 12606B) to router 12602.

Router 12602 determines the next micro-service for service traffic 12612 and forwards the service traffic 12612 to cloud service provider 12606C. The cloud service provider 12606C network applies its micro-service and returns the service traffic 12612 (which may be modified in accordance with the micro-service applied by cloud service provider 12606C) to router 12602. Router 12602 determines the next micro-service for service traffic 12612 and forwards the service traffic 12612 to cloud service provider 12606D.

Again, in some examples, CSPs 12606 may originate and edge network 12600 may deliver service traffic downstream to customer 12604, with edge network 12600 applying a set of micro-services to such downstream service traffic. For instance, the cloud service provider 12606D network may include or otherwise represent a content delivery network (CDN). A CDN may offer streaming video, streaming audio, streaming multimedia, gaming content, or other content delivery services to customers, and in this case to customer 12604 via the cloud exchange.

As a result, the edge network 12600 including a cloud exchange interconnects, in the data plane, micro-services provided by respective cloud services providers 12606 on behalf of and for the benefit of a customer 12604 of the cloud exchange or of at least one of the cloud service providers.

When provided with a service definition for an end-to-end service having multiple component micro-services, a programmable network platform as described herein may orchestrate each of the micro-services within the cloud exchange and stitch the micro-services together according to the defined topology in order to reify the end-to-end service within the cloud exchange (or edge network that includes the cloud exchange). In accordance with techniques of this disclosure, the service definition for an end-to-end service may enable a user of the programmable network platform to define not only the end-to-end service but also the service topology in such a ways as to ensure the correct sequencing of the micro-services service chain. The data encapsulated in the data model for the service definition may also include the authoritative service owner for business purposes (e.g., billing and SLA assurance). The "user" may refer to a customer, the cloud exchange provider, or a cloud service provider that is the authoritative service owner.

By using a data model for a multi-cloud, multi-service service definition as described herein, the programmable network platform (or other orchestration systems such as SDN controllers or orchestrators) may be enabled to recognize a service request as a request for a set of micro-services that make up the entire service. In some examples, the service definition includes several sections that will enable the programmable network platform to provide the service of chaining several services, whether of native services provided by the cloud exchange provider or of cloud services provided one or multiple cloud service providers. That is, the cloud exchange provider that administers the programmable network platform is able to provide a service chain that, when given respective definitions for multiple micro-services and a topology (or sequence) for the multiple micro-services, interconnects the micro-services according to the topology to facilitate an end-to-end service. The data model thus provides data with which the programmable network platform can effectively instantiate the requested chain of services and to also ensure that the services thus rendered are chained in the correct topology. The data model may be divided by the programmable network platform into one or more service requests that the native programmable network platform for the cloud exchange may issue to other service orchestration systems to complete. Other service orchestration systems may include, e.g., SDN controllers and/or orchestration systems for cloud service providers that facilitate NFV-instantiation and service traffic routing to/from NFV instances.

A service definition conforming to a multi-cloud, multi-service data model of the described techniques may specify an overall end-to-end service associated with one or more of (1) an originator, (2) an owner, (3) a identifier, (4) a destination, and (5) a topology. The originator refers to the end-to-end service requestor, typically but not exclusively a customer of the cloud exchange. The owner refers to the authoritative service owner that, e.g., handles and is responsible for billing and charging to the originator/customer on behalf of the cloud service providers. The identifier uniquely identifies the end-to-end service within the cloud exchange. The destination refers to the cloud exchange where the requested service is instantiated. The topology determines the sequence of an array of micro-services included in the service definition.

Each micro-service defined within a service definition may be an element of an array of micro-services. A micro-service may be associated in the data model with one or more of (1) descriptive information, (2) a first or "customer" endpoint, (3) a second or "cloud service provider" endpoint, (4) policies to be applied by the cloud exchange for the micro-service, (5) Quality-of-Service (QoS) parameters for the micro-service, and (6) a time range for the micro-service.

The descriptive information may include a unique identifier for the micro-service within the cloud exchange. The first endpoint for the data model may specify a customer identifier to which the cloud exchange is to attach for service delivery, and a service key. A service key is the license key obtained by a customer for purposes of instantiating and activating a requested service. In the event a service is temporarily requested by the cloud exchange itself, the cloud exchange may obtain the service key from the cloud service provider and use the service key to instantiate and activate the service. The second endpoint for the data model may specify a cloud service provider identifier to which the cloud exchange is to attach for service delivery, and a service key. Each endpoint description for the first and second endpoint may also include endpoint specific data, such as a metro location identifier, port identifiers, data center identifiers, virtual circuits and virtual circuit bandwidth, profiles, and configuration, and so forth.

The policies may identify the configuration and settings to be applied on corresponding micro-services. For example, a policy may include firewall rules for a firewall micro-service within the service chain. Another policy may include packet inspection rules for a DPI micro-service. Another policy may specify the QoS to be applied for a QoS micro-service. The time range is used to specify the duration for which the service metrics are to be reported when querying the status of the service. In some examples, the time range is used only during the READ operation of the service.

The programmable network service data model may be used by a service interface of any of the examples of programmable network platforms described herein to allow external applications to define a topology of micro-services. The following MS_API definition is an example of a programmable network service data model, according to techniques described herein:

```
MS_API
{
    SRVC_Tag
    {
        SRVC_Orig: Varchar
        SRVC_Owner: Varchar
        SRVC_accID: Varchar
        SRVC_Dest: Varchar
        SRVC_Topology: Varchar
    }
    SRVC_Num: Integer // Number of SRVC_API elements
    SRVC_Value
    {
        SRVC_API
        {
            // Micro-service 1
        }
        SRVC_API
        {
            // Micro-service 2
        }
        ...
        SRVC_API
        {
            // Micro-service N
        }
    } // End micro-service definitions
} // End service definition
```

The MS_API end-to-end service definition data model includes SRVC_Tag and SRVC_Value containers. The SRVC_Tag container includes values associated with the overall service definition. Specifically, SRVC_Orig specifies the originator, SRVC_Owner specifies the authoritative owner for the service, SRVC_accID specifies the account identifier belonging to the service originator that identifies the originator to the cloud exchange provider, SRVC_Dest specifies the cloud exchange where the requested service is instantiated, and SRVC_Topology specifies a sequence of an array of micro-services specified in the SRVC_Value container.

The SRVC_Value is a micro-service definition container and includes one or more micro-service definitions for respective micro-services. The following SRVC_API data model is an example of a micro-service definition, e.g., for the MS_API definition model above:

```
SRVC_API
{
    Srvc_Defn
    {
        Srvc_AccID: VarChar
        Srvc_Type: VarChar
        Srvc_Oper_Type: VarChar
        Srvc_ID: VarChar
        Target_SP: VarChar
        Srvc_Vendor: VarChar
        EndPoint1 {
            SP_ID: VarChar
            Srvc_Key: VarChar[ ]
            EP_Data {
                <Data Specific for Defined Service>
```

```
            }
    } // End Endpoint1 Definition
    EndPoint2 {
        SP_ID: VarChar
        Srvc_Key: VarChar[ ]
        EP_Data {
            <Data Specific for Defined Service>
        }
    } // End Endpoint2 Definition
} // End Service Definition
Policy {
    <Data Specific to Policy Definition of Defined Service>
} // End Policy Definition
QOS {
    <<Parameter: Configured_Value, Real_Value>>
    Availability: VarChar, VarChar
    Bandwidth: Num, Num
    Burstable: Boolean
    Burst_EIR: VarChar,V arChar
    Class_Of_Service: VarChar, VarChar
    {
        Latency: [VarChar, VarChar],[VarChar, VarChar]
        Jitter: [VarChar, VarChar, VarChar, VarChar]
        ErrorRate: [VarChar,VarChar],[VarChar, VarChar]
        PacketDrops: [VarChar,VarChar],[VarChar,
            VarChar]
    }
} // End QOS definition
TimeRange {
    Start_Time: VarChar
    End_Time: VarChar
} // End Time Range Definition
} // End SRVC_API
```

The above service definition includes service definition ("Srvc_Defn"), policy ("Policy"), quality of service ("QOS"), and time range ("TimeRange") containers for specifying and obtaining characteristics of a micro-service via the programmable network platform. The service definition container specifies descriptive information for the micro-service, including Srvc_AccID, Srvc_Type, Srvc_Oper_Type, Srvc_ID, Target_SP, Srvc_Vendor. Srvc_AccID is a unique account identifier that identifies a particular service originator uniquely with the particular target service provider, Target_SP. Srvc_Type may be applicable only when native cloud exchange services are provided and, defines the type of cloud exchange service being delivered. Srvc_Oper_ Type specifies the operation type, i.e., one of the CRUD operations. Srvc_ID is to be provided by the originator for an already existing (e.g., already created) service for which a Read, Update or Delete operations are to be performed. Target_SP is the target service provider that provides the requested service The EndPoint1 container defines a first endpoint of the cloud exchange for the micro-service and specifies a service provider identifier (SP_ID) to which the cloud exchange is to attach for service delivery using a service key or license key. The EndPoint2 container defines a second endpoint of the cloud exchange for the micro-service and specifies a cloud service provider identifier ("CSP_ID") to which the cloud exchange is to attach for service delivery, and a service key. Each endpoint description for the first and second endpoints also includes endpoint specific data, such as a metro location identifier, port identifiers, data center identifiers, and so forth.

The policies in the Policy container may identify the configurations settings that needs to be applied to the service being instantiated, examples of policies for said services including firewall rules, NAT rules, encryption policies, WAN optimization policies, and so forth. In other words, the policies determine how the services applied will be configured for application to the service traffic between the first and second endpoints for the micro-service. The QoS parameters in the QOS container specify the QoS to be applied to service traffic for the micro-service. The time range in the TimeRange container specifies a start time and end time that define a duration of the micro-service, during which the programmable network platform may provide assurance to the originator and/or owner using the service identifier ("Srvc_ID").

The interface for communicating service definitions according to the data model may include eXtensible Markup Language (XML) or JavaScript Object Notation (JSON) over HTTP/HTTPS. That is, the cloud exchange provider may define an XML/JSON interface that receives service definitions according to the above-described exampled service data mode, and expose HTTP endpoints by which to receive such service definitions.

Figure 15:
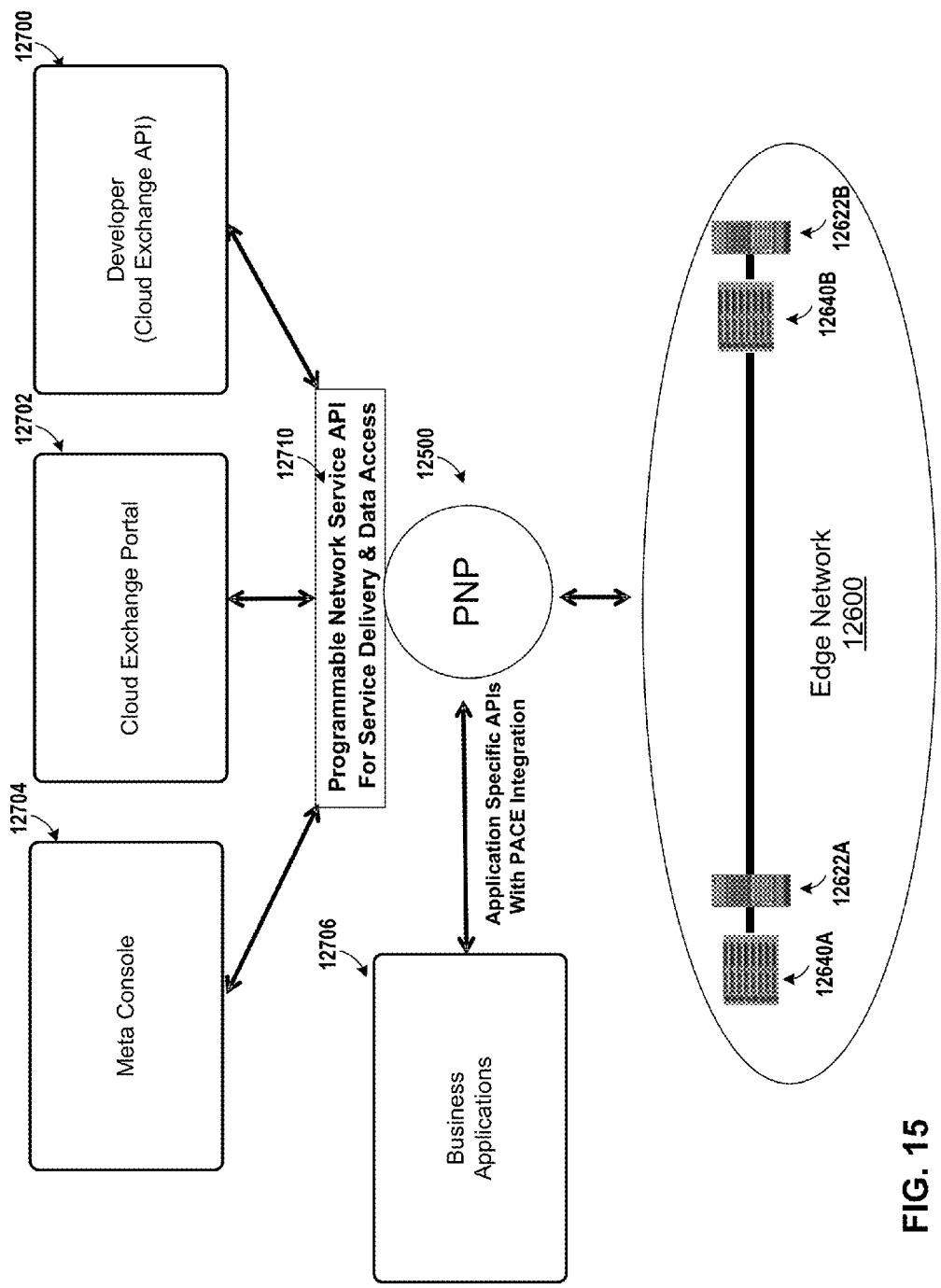
FIG. 15 is a conceptual diagram illustrating interfaces among components for programming a cloud exchange using a programmable network platform according to techniques described in this disclosure.

FIG. 15 is a conceptual diagram illustrating interfaces among components for programming a cloud exchange using a programmable network platform according to techniques described in this disclosure. Programmable network platform 12500 exposes a service API 12710 for service delivery and data access. This various embodiments of APIs and other interfaces described elsewhere in this disclosure for communicating with embodiments of programmable network platform 12500 may all represent examples of service API 12710. Service API 12710 may use a programmable network service data model, such as MS_API described above, for defining an end-to-end service made up of a topology of micro-services.

Meta console 12704 represents a platform manufactured by the cloud service provider, usable by cloud service provider technicians or operators, e.g., that invokes the service API 12710 of programmable network platform 12500. "CX" or customer portal 12702 represents a platform manufactured by the cloud service provider, usable by enterprise/customer/CSP technicians or operators, e.g., that invokes the service API 12710 of programmable network platform 12500. Cloud exchange developer (CX API) 12700 represents third-party developed or cloud-service provider-developed platforms created by third-party developers (e.g., CSP or customer developers) or cloud exchange provider developers that invoke service API 12710 to request services from the programmable network platform 12500.

Business Applications 12706 may store accounting information for customers. For instance, Business Applications 12706 may store billing information for customers, such as name, customer identifier, address, phone number, email, to name only a few examples. When programmable network platform 12500 configures a service for a customer that includes a service charge, Business Applications 12706 may store such expense information. In this way, Business Applications 12706 may provide an accounting of services purchased by a customer and provide unified billing for such services. The API between Business Applications 12706 and programmable network platform 12500 may include PACE integration.

FIG. 16 is a block diagram illustrating a programmable network platform that includes interfaces by which external applications may configure a cloud exchange to facilitate delivery of cloud services from cloud service providers according to techniques described in this disclosure. In this example, programmable network platform 12500 exposes a service API 12820 for service delivery and data access. This various embodiments of APIs and other interfaces described elsewhere in this disclosure for communicating with embodiments of programmable network platform 12500 may all represent examples of service API 12820.

Service API 12820 includes, in this example, at least one third-party plugin 12810 developed by cloud service providers and executed by the programmable network platform 12500 to request and establish layer 3 cloud services from the cloud service providers. Plugin 12810 may represent any of third-party orchestration modules 10404. The plugin 12810 may implement a common plugin interface for the programmable network platform 12500 and translate interface methods, fields, etc., to a cloud service provider interface for CSP orchestration. For example, programmable network platform 12500 may invoke plugin 12810 to request a service instance from a cloud service provider for the cloud exchange provider (e.g., a 60 GB data storage service). Plugin 12810 for the cloud service provider receives the request and invokes CSP orchestration system 12800 to allow the cloud service provider to orchestrate the instantiation of the requested service. CSP orchestration 12800 via plugin 12810 then returns connectivity information in the form of a "network handle" to the programmable network platform 12500. The network handle includes information by which the cloud exchange can connect to the instantiated, requested service. For example, the network handle may include a VxLAN or VLAN identifier, a layer 3 route or network address, tunnel information and/or cloud aggregate link information. The programmable network platform 12500 uses the network handle to configure edge network 12600 to connect to the instantiated, requested service, and to interconnect at least one customer network to the instantiated, requested service.

Operations portal 12804 represents a platform manufactured by the cloud service provider, for use by cloud service provider 12804 technicians or operators, e.g., that invokes the service API 12820 of programmable network platform 12500. CSP orchestration system 12800 represents one or more systems developed by the cloud service providers and usable by the programmable network platform 12500 to request layer 3 services from the cloud service providers. API gateway 12802 offers a high-level API by which customer-developed platforms or a cloud service provider-developed customer portal may request services from the programmable network platform 12500. Additional details of the API gateway and high-level API are found in U.S. Provisional Patent Appln. No. 62/072,976, incorporated above.

Figure 17:
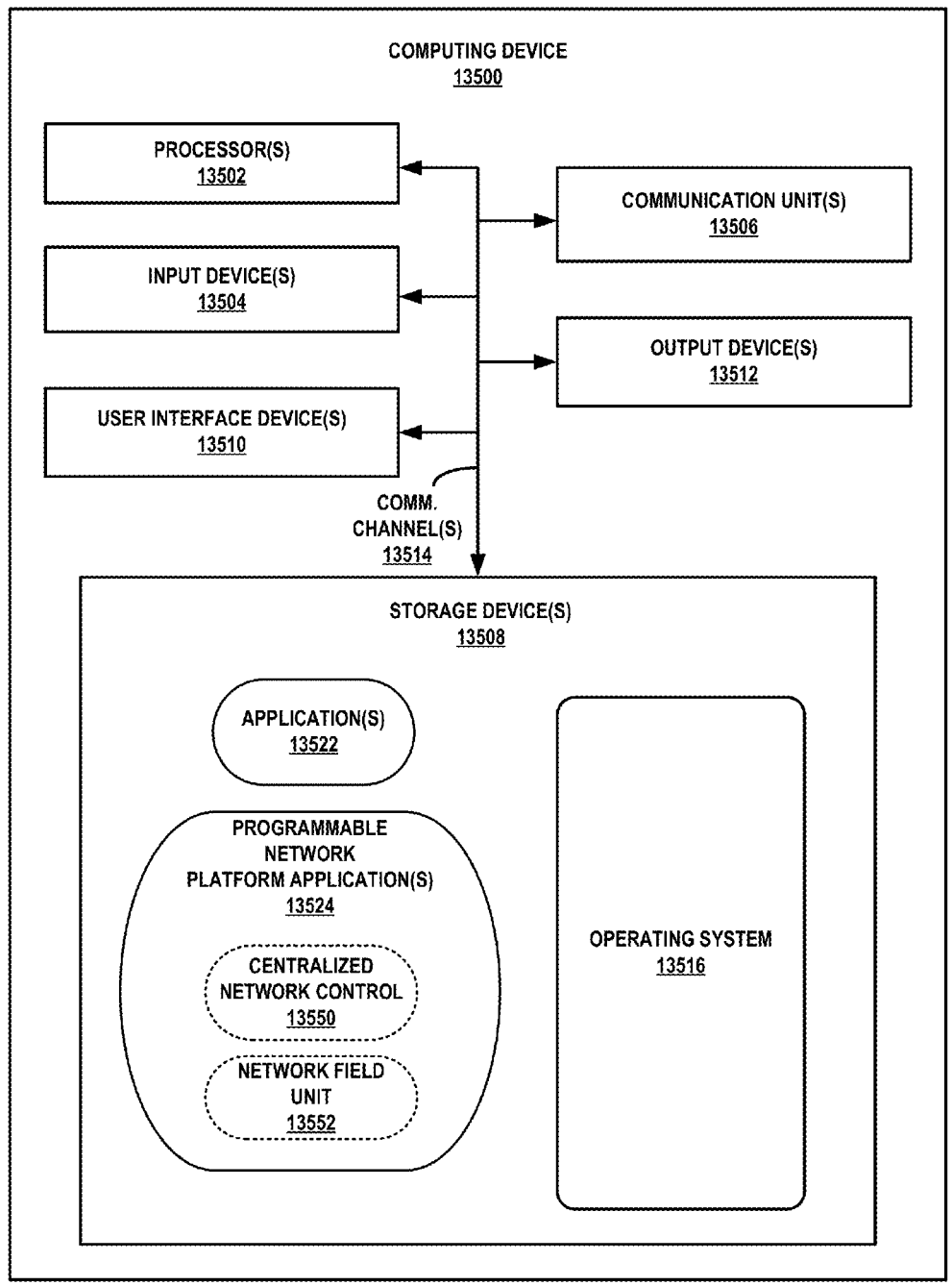
FIG. 17 is a block diagram illustrating further details of one example of a computing device that operates in accordance with one or more techniques of the present disclosure.

FIG. 17 is a block diagram illustrating further details of one example of a computing device that operates in accordance with one or more techniques of the present disclosure. FIG. 17 may illustrate a particular example of a server or other computing device 13500 that includes one or more processor(s) 13502 for executing any one or more of the programmable network platform components (e.g., CNC, NFU, etc.), or any other system, application, or module described herein. Other examples of computing device 13500 may be used in other instances. Although shown in FIG. 17 as a stand-alone computing device 13500 for purposes of example, a computing device may be any component or system that includes one or more processors or other suitable computing environment for executing software instructions and, for example, need not necessarily include one or more elements shown in FIG. 17 (e.g., communication units 13506; and in some examples components such as storage device(s) 13508 may not be co-located or in the same chassis as other components).

As shown in the specific example of FIG. 17, computing device 13500 includes one or more processors 13502, one or more input devices 13504, one or more communication units 13506, one or more output devices 13512, one or more storage devices 13508, and user interface (UI) device 13510, and communication unit 13506. Computing device 13500, in one example, further includes one or more applications 13522, programmable network platform application(s) 13524, and operating system 13516 that are executable by computing device 13500. Each of components 13502, 13504, 13506, 13508, 13510, and 13512 are coupled (physically, communicatively, and/or operatively) for inter-component communications. In some examples, communication channels 13514 may include a system bus, a network connection, an inter-process communication data structure, or any other method for communicating data. As one example, components 13502, 13504, 13506, 13508, 13510, and 13512 may be coupled by one or more communication channels 13514.

Processors 13502, in one example, are configured to implement functionality and/or process instructions for execution within computing device 13500. For example, processors 13502 may be capable of processing instructions stored in storage device 13508. Examples of processors 13502 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 13508 may be configured to store information within computing device 13500 during operation. Storage device 13508, in some examples, is described as a computer-readable storage medium. In some examples, storage device 13508 is a temporary memory, meaning that a primary purpose of storage device 13508 is not long-term storage. Storage device 13508, in some examples, is described as a volatile memory, meaning that storage device 13508 does not maintain stored contents when the computer is turned off. Examples of volatile memories include random access memories (RAM), dynamic random access memories (DRAM), static random access memories (SRAM), and other forms of volatile memories known in the art. In some examples, storage device 13508 is used to store program instructions for execution by processors 13502. Storage device 13508, in one example, is used by software or applications running on computing device 13500 to temporarily store information during program execution.

Storage devices 13508, in some examples, also include one or more computer-readable storage media. Storage devices 13508 may be configured to store larger amounts of information than volatile memory. Storage devices 13508 may further be configured for long-term storage of information. In some examples, storage devices 13508 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 13500, in some examples, also includes one or more communication units 13506. Computing device 13500, in one example, utilizes communication units 13506 to communicate with external devices via one or more networks, such as one or more wired/wireless/mobile networks. Communication units 13506 may include a network interface card, such as an Ethernet card, an optical transceiver, a radio frequency transceiver, or any other type of device that can send and receive information. In some examples, computing device 13500 uses communication unit 13506 to communicate with an external device.

Computing device 13500, in one example, also includes one or more user interface devices 13510. User interface devices 13510, in some examples, are configured to receive input from a user through tactile, audio, or video feedback. Examples of user interface devices(s) 13510 include a presence-sensitive display, a mouse, a keyboard, a voice responsive system, video camera, microphone or any other type of device for detecting a command from a user. In some examples, a presence-sensitive display includes a touch-sensitive screen.

One or more output devices 13512 may also be included in computing device 13500. Output device 13512, in some examples, is configured to provide output to a user using tactile, audio, or video stimuli. Output device 13512, in one example, includes a presence-sensitive display, a sound card, a video graphics adapter card, or any other type of device for converting a signal into an appropriate form understandable to humans or machines. Additional examples of output device 13512 include a speaker, a cathode ray tube (CRT) monitor, a liquid crystal display (LCD), or any other type of device that can generate intelligible output to a user.

Computing device 13500 may include operating system 13516. Operating system 13516, in some examples, controls the operation of components of computing device 13500. For example, operating system 13516, in one example, facilitates the communication of one or more applications 13522 and programmable network platform application(s) 13524 with processors 13502, communication unit 13506, storage device 13508, input device 13504, user interface devices 13510, and output device 13512.

Application 522 and programmable network platform application(s) 13524 may also include program instructions and/or data that are executable by computing device 13500. Example programmable network platform application(s) 13524 executable by computing device 13500 may include any one or more of centralized network control application 13550 ("CNC 13550") and network field unit application 13552 ("NFU 13552"), each illustrated with dashed lines to indicate that these may or may not be executable by any given example of computing device 13500.

Centralized network control 13550 may include instructions for causing computing device 13500 to perform one or more of the operations and actions described in the present disclosure with respect to centralized network control. As one example, CNC 13550 may include instructions that cause computing device 13500 to establish, de-install and manage interconnections with multiple, different cloud service providers participating in the cloud exchange in an automated and seamless manner.

Network Field Unit 13552 may include instructions for causing computing device 13500 to perform one or more of the operations and actions described in the present disclosure with respect to network field units. As one example, NFU 13552 may include instructions that cause computing device 13500 to receive requests or instructions from a CNC executing on another server, e.g., in a different geographically location such as a different data center, to configure network infrastructure of a cloud exchange point in order to provision one or more services.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following examples.

What is claimed is:

1. A programmable network platform comprising:
at least one programmable processor coupled to memory;
a first third-party orchestration module stored to the memory and configured for execution by the at least one programmable processor to communicate with a first cloud service provider orchestration system;
a second third-party orchestration module stored to the memory and configured for execution by the at least one programmable processor to communicate with a second cloud service provider orchestration system; and
a centralized network controller stored to the memory and configured for execution by the at least one programmable processor to receive a first service request that specifies a first cloud service applied by a first cloud service provider network operated by a first cloud service provider and coupled to a network of a cloud exchange operated by a cloud exchange provider, the network comprising at least one layer three (L3) autonomous system located within at least one data center and a plurality of attachment circuits to connect, within the at least one data center, the first cloud service provider network and a second cloud service provider network to the L3 autonomous system, wherein the centralized network controller is further configured to, in response to the first service request, invoke the first third-party orchestration module to communicate with the first cloud service provider orchestration system to request that the first cloud service provider orchestrate the first cloud service, wherein the centralized network controller is further configured for execution by the at least one programmable processor to receive a second service request that specifies a second cloud service applied by the second cloud service provider network, wherein the centralized network controller is further configured to, in response to the second service request, invoke the second third-party orchestration module to communicate with the second cloud service provider orchestration system to request that the second cloud service provider orchestrate the second cloud service, and wherein the centralized network controller provisions the network of the cloud exchange to deliver the first cloud service from the first cloud service provider network and to deliver the second cloud service from the second cloud service provider network to a customer network attached to the network of the cloud exchange.

2. The programmable network platform of claim 1, wherein the first third-party orchestration module registers with the programmable network platform to publish a list or catalog of services applied by the first cloud service provider network.

3. The programmable network platform of claim 2, wherein the centralized network controller is further configured to send the list or catalog of services to a customer portal application for display to a customer that operates the customer network.

4. The programmable network platform of claim 1, wherein the first third-party orchestration module is manufactured by the cloud exchange provider.

5. The programmable network platform of claim 1,
wherein the centralized network controller is further configured to receive, from the first third-party orchestration module, connectivity information for the first cloud service, and
wherein to provision the network of the cloud exchange to deliver the first cloud service, the centralized network controller is further configured to provision, based on the connectivity information, the network of the cloud exchange to enable network connectivity between the network of the cloud exchange and the first cloud service provider network for delivery of the first cloud service.

6. The programmable network platform of claim 5, wherein the connectivity information comprises at least one of a Virtual Local Area Network (VLAN) identifier, a Vx Local Area Network (VxLAN) identifier, a route specifying a network address of the first cloud service provider network, and a port in the network of the cloud exchange.

7. The programmable network platform of claim 1, wherein the first third-party orchestration module and the second third-party orchestration module register a common interface with the centralized network controller by which the centralized network controller can invoke the first third-party orchestration module and the second third-party orchestration module to orchestrate services.

8. The programmable network platform of claim 1,
wherein the cloud exchange comprises an edge network operated by the cloud exchange provider, and
wherein to provision the network of the cloud exchange the centralized network controller is further configured to provision the edge network to receive cloud service traffic for the first cloud service and for distribution to the customer network.

9. The programmable network platform of claim 1,
wherein the network of the cloud exchange comprises:
one or more attachment circuits configured to connect, within the data center, one or more customer networks to the L3 autonomous system, the one or more customer networks including the customer network,
wherein the centralized network controller provisions the L3 autonomous system to interconnect the first cloud service provider network, the second cloud service provider network and the one or more customer networks by establishing end-to-end network paths between the first cloud service provider network, the second cloud service provider network, and the one or more customer networks, each end-to-end network path including one of the plurality of attachment circuits connecting the respective first cloud service provider network and second cloud service provider network to the L3 autonomous system and also including one of the one or more attachment circuits connecting the respective one or more customer networks to the L3 autonomous system, and
wherein the L3 autonomous system is configured to forward cloud service traffic, received on the plurality of attachment circuits connecting the respective first cloud service provider network and second cloud service provider network along the end-to-end network paths, to the one or more attachment circuits connecting the respective one or more customer networks to the L3 autonomous system.

10. The programmable network platform of claim 1, wherein the first service request includes a service definition that specifies one or more service requirements for the first cloud service.

11. The programmable network platform of claim 1,
wherein service traffic for the first cloud service comprises network packets,
wherein to provision the network of the cloud exchange the centralized network controller is further configured to configure an edge network of the network of the cloud exchange to forward the network packets.

12. The programmable network platform of claim 1,
wherein the L3 autonomous system comprises an Internet Protocol network interconnecting a plurality of provider edge (PE) routers by a plurality of tunnels, and
wherein to provision the network of the cloud exchange the centralized network controller is further configured to configure the plurality of PE routers to establish an end-to-end L3 path comprising one of the plurality of tunnels and connecting, at layer 3, the first cloud service provider network to the customer network.

13. A method comprising:
receiving, by a centralized network controller of a programmable network platform, a first service request that specifies a first cloud service applied by a first cloud service provider network operated by a first cloud service provider on a network of a cloud exchange operated by a cloud exchange provider, the network comprising at least one layer three (L3) autonomous system located within at least one data center and a plurality of attachment circuits to connect, within the at least one data center, the first cloud service provider network and a second cloud service provider network to the L3 autonomous system;

invoking, by the centralized network controller in response to the first service request, a first third-party orchestration module to communicate with a first cloud service provider orchestration system to request that the first cloud service provider orchestrate the first cloud service;

receiving, by the centralized network controller, a second service request that specifies a second cloud service applied by the second cloud service provider network operated by a second cloud service provider on the network of the cloud exchange;

invoking, by the centralized network controller in response to the second service request, a second third-party orchestration module to communicate with a second cloud service provider orchestration system to request that the second cloud service provider orchestrate the second cloud service; and provisioning, by the centralized network controller, the network of the cloud exchange to deliver the first cloud service from the first cloud service provider network and to deliver the second cloud service from the second cloud service provider network to a customer network attached to the cloud exchange.

14. The method of claim 13, further comprising:
receiving, by the centralized network controller from the first third-party orchestration module, a list of services offered by the first cloud service provider network.

15. The method of claim 13, wherein the centralized network controller is further configured to send the list of services to a customer portal application for display to a customer that operates the customer network.

16. The method of claim 13, further comprising:
receiving, by the centralized network controller from the first third-party orchestration module, connectivity information for the first cloud service,
wherein to provision the network of the cloud exchange to deliver the first cloud service, the centralized network controller provisions, based on the connectivity information, the network of the cloud exchange to enable network connectivity between the network of the cloud exchange and the first cloud service provider network for delivery of the first cloud service.

17. The method of claim 16, wherein the connectivity information comprises at least one of a Virtual Local Area Network (VLAN) identifier, a Vx Local Area Network (VxLAN) identifier, a route specifying a network address of the first cloud service provider network, and a port in the cloud exchange.

18. The method of claim 13,
wherein the network for the cloud exchange comprises an edge network operated by the first cloud exchange provider, and
wherein to provision the network for the cloud exchange the centralized network controller provisions the edge network to receive cloud service traffic for the first cloud service and for distribution to the customer network.

19. A network data center comprising:
a cloud exchange comprising a network including at least one layer three (L3) autonomous system and a plurality of attachment circuits to connect the first cloud service provider network and a second cloud service provider network to the L3 autonomous system, the cloud exchange operated by a cloud exchange provider; and
a programmable network platform comprising:
at least one programmable processor coupled to memory;
a first third-party orchestration module stored to the memory and configured for execution by the at least one programmable processor to communicate with a first cloud service provider orchestration system;
a second third-party orchestration module stored to the memory and configured for execution by the at least one programmable processor to communicate with a second cloud service provider orchestration system; and
a centralized network controller stored to the memory and configured for execution by the at least one programmable processor to receive a first service request that specifies a first cloud service applied by a first cloud service provider network operated by a first cloud service provider and coupled to the network of the cloud exchange,
wherein the centralized network controller is further configured to, in response to the first service request, invoke the first third-party orchestration module to communicate with the first cloud service provider orchestration system to request that the first cloud service provider orchestrate the first cloud service,
wherein the centralized network controller is further configured to receive a second service request that specifies a second cloud service applied by a second cloud service provider network operated by a second cloud service provider and coupled to the network of the cloud exchange,
wherein the centralized network controller is further configured to, in response to the second service request, invoke the second third-party orchestration module to communicate with the second cloud service provider orchestration system to request that the second cloud service provider orchestrate the second cloud service, and
wherein the centralized network controller provisions the network of the cloud exchange to deliver the first cloud service from the first cloud service provider network and to deliver the second cloud service from the second cloud service provider network to a customer network attached to the network of the cloud exchange.

* * * * *